US011145068B2

(12) United States Patent
Ohira et al.

(10) Patent No.: US 11,145,068 B2
(45) Date of Patent: Oct. 12, 2021

(54) IMAGE-PROCESSING APPARATUS, IMAGE-PROCESSING SYSTEM, IMAGE-PROCESSING METHOD, AND STORAGE MEDIUM

(71) Applicants: Kabushiki Kaisha Toshiba, Minato-ku (JP); Toshiba Digital Solutions Corporation, Kawasaki (JP)

(72) Inventors: Hidetaka Ohira, Fuchu (JP); Ryohei Tanaka, Kawasaki (JP); Shuta Yanaga, Kawasaki (JP); Kenji Furukawa, Machida (JP); Mayumi Ikeda, Ota (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 106 days.

(21) Appl. No.: 16/130,514

(22) Filed: Sep. 13, 2018

(65) Prior Publication Data
US 2019/0139229 A1    May 9, 2019

(30) Foreign Application Priority Data
Nov. 8, 2017 (JP) .............................. JP2017-215983

(51) Int. Cl.
*G06T 7/20* (2017.01)
*G08B 13/196* (2006.01)
*G06T 7/11* (2017.01)

(52) U.S. Cl.
CPC ................. *G06T 7/20* (2013.01); *G06T 7/11* (2017.01); *G08B 13/196* (2013.01);
(Continued)

(58) Field of Classification Search
CPC ... G06T 7/20; G06T 7/11; G06T 2207/30196; G06T 2207/30232; G08B 13/196
See application file for complete search history.

(56) References Cited

U.S. PATENT DOCUMENTS

| 10,147,287 B2 | 12/2018 | Bamba | |
| 2008/0252448 A1* | 10/2008 | Agarwalla | ......... G08B 13/1968 340/540 |

(Continued)

FOREIGN PATENT DOCUMENTS

| JP | 2010-63001 A | 3/2010 |
| JP | 2012-84012 A | 4/2012 |

(Continued)

*Primary Examiner* — Asghar H Bilgrami
(74) *Attorney, Agent, or Firm* — Oblon, McClelland, Maier & Neustadt, L.L.P.

(57) ABSTRACT

According to one embodiment, an image-processing apparatus includes an output unit, a tracker, a storage controller, a setter, and an output controller. The tracker tracks a target object in one or more time-series images. The storage controller stores tracking information including a movement trajectory of the object in a predetermined storage. The setter sets a detection region for detecting passing through of the object based on the movement trajectory of the object, on the image, in accordance with a user's operation. An evaluator evaluates a setting mode for the detection region based on the tracking information stored in the predetermined storage and the detection region set by the setter. The output controller outputs the tracking information stored in predetermined storage, from the output unit, in an output mode based on an evaluation result of the evaluator.

23 Claims, 17 Drawing Sheets

(52) U.S. Cl.
CPC ............... *G06T 2207/20104* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 2008/0306756 A1* | 12/2008 | Sorensen | G06Q 30/02 705/27.1 |
| 2012/0293486 A1* | 11/2012 | Adachi | G06T 7/248 345/418 |
| 2015/0016671 A1 | 1/2015 | Adachi | |
| 2015/0023554 A1* | 1/2015 | Kita | G06T 7/254 382/103 |
| 2017/0039728 A1* | 2/2017 | Bamba | G08B 13/19602 |
| 2017/0280166 A1* | 9/2017 | Walkingshaw | H04N 13/368 |
| 2018/0113577 A1* | 4/2018 | Burns | H04N 21/47217 |
| 2020/0182995 A1* | 6/2020 | Zeng | G01S 13/003 |

FOREIGN PATENT DOCUMENTS

| | | |
|---|---|---|
| JP | 2012-243161 | 12/2012 |
| JP | 5885398 | 3/2016 |
| JP | 2016-116137 | 6/2016 |
| JP | 2017-33408 A | 2/2017 |
| JP | 6159179 | 7/2017 |

* cited by examiner

| EACH FACILITY | | |
|---|---|---|
| AREA UNDER SURVEILLANCE | DETECTION LINE-SETTING MODE | UPDATING DAY |
| AREA A | ** | 2019/12/21 |
| AREA B | ** | 2019/8/3 |
| AREA C | ** | 2019/8/3 |
| ... | ... | ... |

REFLECTION

IMAGE-PROCESSING APPARATUS, IMAGE-PROCESSING SYSTEM, IMAGE-PROCESSING METHOD, AND STORAGE MEDIUM

CROSS-REFERENCE TO RELATED APPLICATIONS

This application is based upon and claims the benefit of priority from Japanese Patent Application No. 2017-215983, filed Nov. 8, 2017, the entire contents of which are incorporated herein by reference.

FIELD

Embodiments described herein relate generally to an image-processing apparatus, an image-processing system, an image-processing method, and a storage medium.

BACKGROUND

Hitherto, a technique has become known in which cameras are installed in the vicinity of the entrance port of a building, and persons are tracked on images captured by the cameras, to detect that the tracked persons enter or leave rooms. In such a technique, it is determined whether a person who is a target for tracking enters a room or leaves a room, for example, in accordance with whether the person passes through a detection line. However, in the related art, in a case where the detection line is set at a position where it is difficult to determine the presence or absence of passing through, or the detection line is set at a position where it is determined that a person who does not enter or leave a room has passed through, there is a problem of a decrease in the accuracy of detection of a person who enters or leaves a room.

DETAILED DESCRIPTION

According to one embodiment, an image-processing apparatus includes an output unit, a tracker (tracking unit), a storage controller (storage control unit), a setter (setting unit), and an output controller (output control unit). The output unit outputs information. The tracker tracks an object which is a target in one or more time-series images. The storage controller stores tracking information, including movement trajectories of one or more of the objects tracked by the tracker, in a predetermined storage. The setter sets a detection region for detecting passing through of the object on the basis of the movement trajectory of the object, on the image, in accordance with a user's operation. An evaluator evaluates a setting mode for the detection region on the basis of the tracking information stored in the predetermined storage and the detection region which is set by the setter. The output controller outputs the tracking information stored in the predetermined storage, from the output unit, in an output mode based on an evaluation result of the evaluator.

Hereinafter, an image-processing apparatus, an image-processing system, an image-processing method, and a storage medium of an embodiment will be described with reference to the accompanying drawings.

First Embodiment

Figure 1:
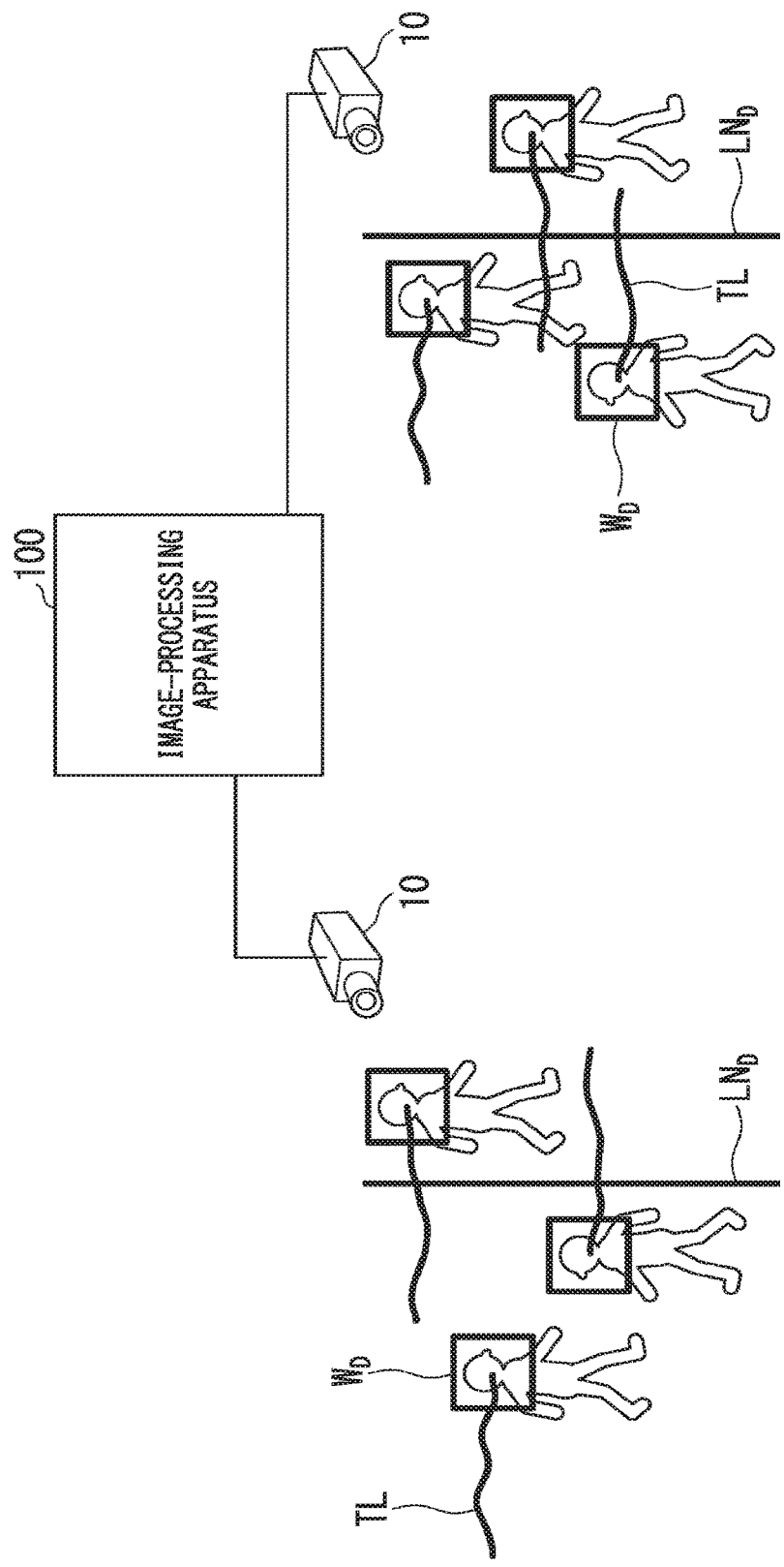
FIG. 1 is a schematic diagram showing an example of a configuration of an image-processing system of a first embodiment.

FIG. 1 is a schematic diagram showing an example of a configuration of an image-processing system 1 of a first embodiment. The image-processing system 1 of the first embodiment includes, for example, one or more cameras 10 and an image-processing apparatus 100. These apparatuses may be connected to each other through, for example, a local area network (LAN) or the like. Each camera 10 is installed in the vicinity of, for example, entrance ports located inside various buildings such as commercial facilities or public facilities. More specifically, each camera 10 is installed on ceilings or the like in the vicinity of the entrance ports, and repeatedly captures an image of the surroundings at predetermined time intervals from a viewpoint of looking down from its installation position. The predetermined time interval is a time interval for a frame rate of, for example, 30 frames per second (FPS), 60 FPS, 120 FPS, or the like. Each camera 10 generates a set of time-series images, that is, a moving image by repeatedly capturing an image of the surroundings. This moving image may include, for example, a colorscale moving image, a grayscale moving image, or the like. In addition, for example, in a case where the camera 10 is provided with a distance sensor that measures a distance in a depth direction using infrared rays or the like, a moving image which is generated by the camera 10 may include a distance moving image (depth moving image).

The image-processing apparatus 100 is installed, for example, individually in each building, and performs image processing on a moving image generated by each of one or more cameras 10 installed in the same building, to thereby detect persons who go in (enter a room) or persons who go out (leave a room) at each entrance port. For example, the image-processing apparatus 100 sets a detection window $W_D$ for detecting a person who is a target for detection with respect to each frame constituting a moving image, and scans this detection window $W_D$ in the two-dimensional direction of a frame, to thereby detect at which position in a frame region the person is present. The image-processing apparatus 100 derives a trajectory obtained by linking detection windows $W_D$ in which a person is detected in each frame in a time direction, as a person's movement trajectory (hereinafter, referred to as a tracklet TL), and determines whether a person enters an entrance port or leaves an entrance port on the basis of this tracklet TL and a detection line $LN_D$.

The image-processing apparatus 100 may perform such processes, for example, on-line and in real time, and may store a moving image in a storage device followed by processing the moving image off-line. Meanwhile, the image-processing apparatus 100 may be installed in another building without being limited to being installed in the same building as a building in which the camera 10 is installed. In this case, the camera 10 and the image-processing apparatus 100 may be connected to each other through a wide area network (WAN) or the like. In addition, some functions of the image-processing apparatus 100 may be realized by another computer (such as, for example, a cloud server) connected to a wide area network (WAN).

Figure 2:
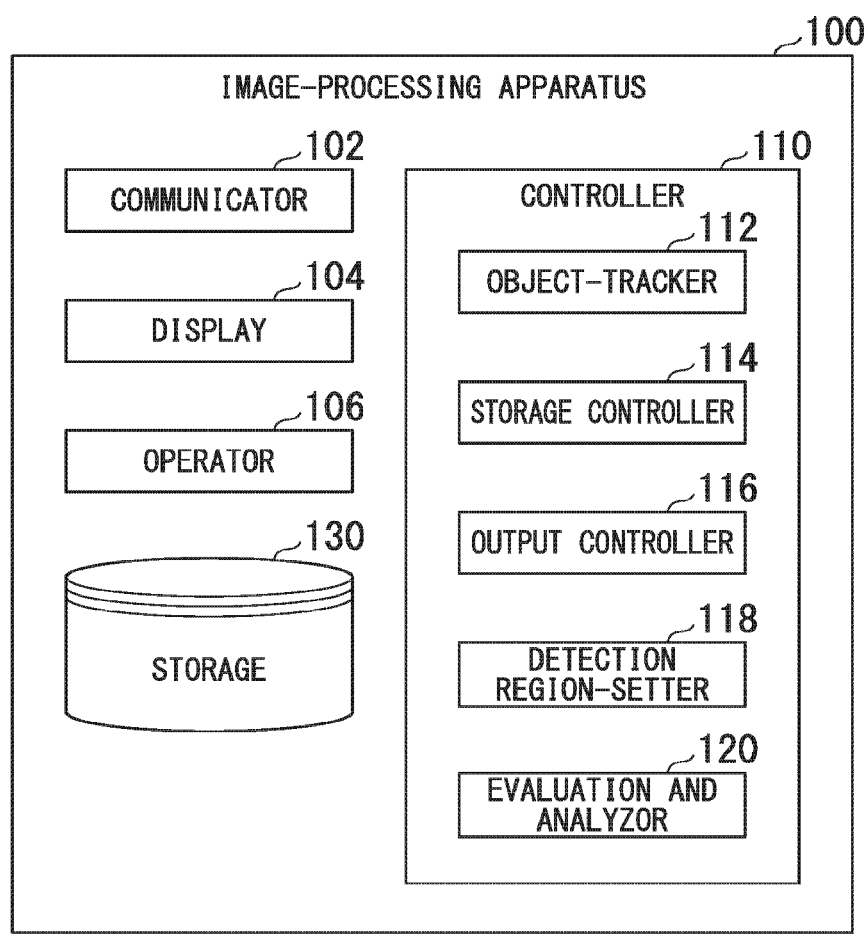
FIG. 2 is a diagram showing an example of a configuration of an image-processing apparatus of the first embodiment.

FIG. 2 is a diagram showing an example of a configuration of the image-processing apparatus 100 of the first embodiment. The image-processing apparatus 100 includes, for example, a communicator (communication unit) 102, a display 104, an operator (operating unit) 106, a controller 110, and a storage 130. The display 104 is an example of an "output unit".

The communicator 102 includes a hardware interface such as a network interface card (NIC) capable of being connected to a network such as a LAN or a WAN. For example, the communicator 102 communicates with the camera 10 through a network, and acquires a moving image from the camera 10 of its communication partner.

The display 104 includes a display device such as, for example, a liquid crystal display (LCD) or an organic electroluminescence (EL) display. The display 104 displays an image under control performed by the controller 110.

The operator 106 includes a user interface such as, for example, a button, a keyboard or a mouse. The operator 106 accepts a user's operation, and outputs information according to the accepted operation to the controller 110. Meanwhile, the operator 106 may be a touch panel configured integrally with the display 104.

The controller 110 includes, for example, an object-tracker (object-tracking unit) 112, a storage controller 114, an output controller 116, a detection region-setter (detection region-setting unit) 118, and an evaluation and analyzer 120. These components of the controller 110 are realized by a processor such as a central processing unit (CPU) or a graphics-processing unit (GPU) executing a program (software) stored in the storage 130. In addition, some or all of the components of the controller 110 may be realized by hardware (circuitry) such as a large-scale integration (LSI), an application-specific integrated circuit (ASIC), a field-programmable gate array (FPGA), or a graphics-processing unit (GPU), and may be realized by cooperation between software and hardware. In addition, the above program may be stored in the storage 130 in advance, and may be stored on a detachable storage medium such as a DVD or a CD-ROM and be installed in the storage 130 from the storage medium by the storage medium being mounted in the drive device of the image-processing apparatus 100.

The storage 130 is realized by, for example, a hard disk drive (HDD), a flash memory, an electrically erasable programmable read-only memory (EEPROM), a read-only memory (ROM), a random-access memory (RAM), or the like. In the storage 130, moving images acquired from the camera 10, various processing results, and the like are stored in addition to a program referred to by a processor.

[Process Flow]

Figure 3:
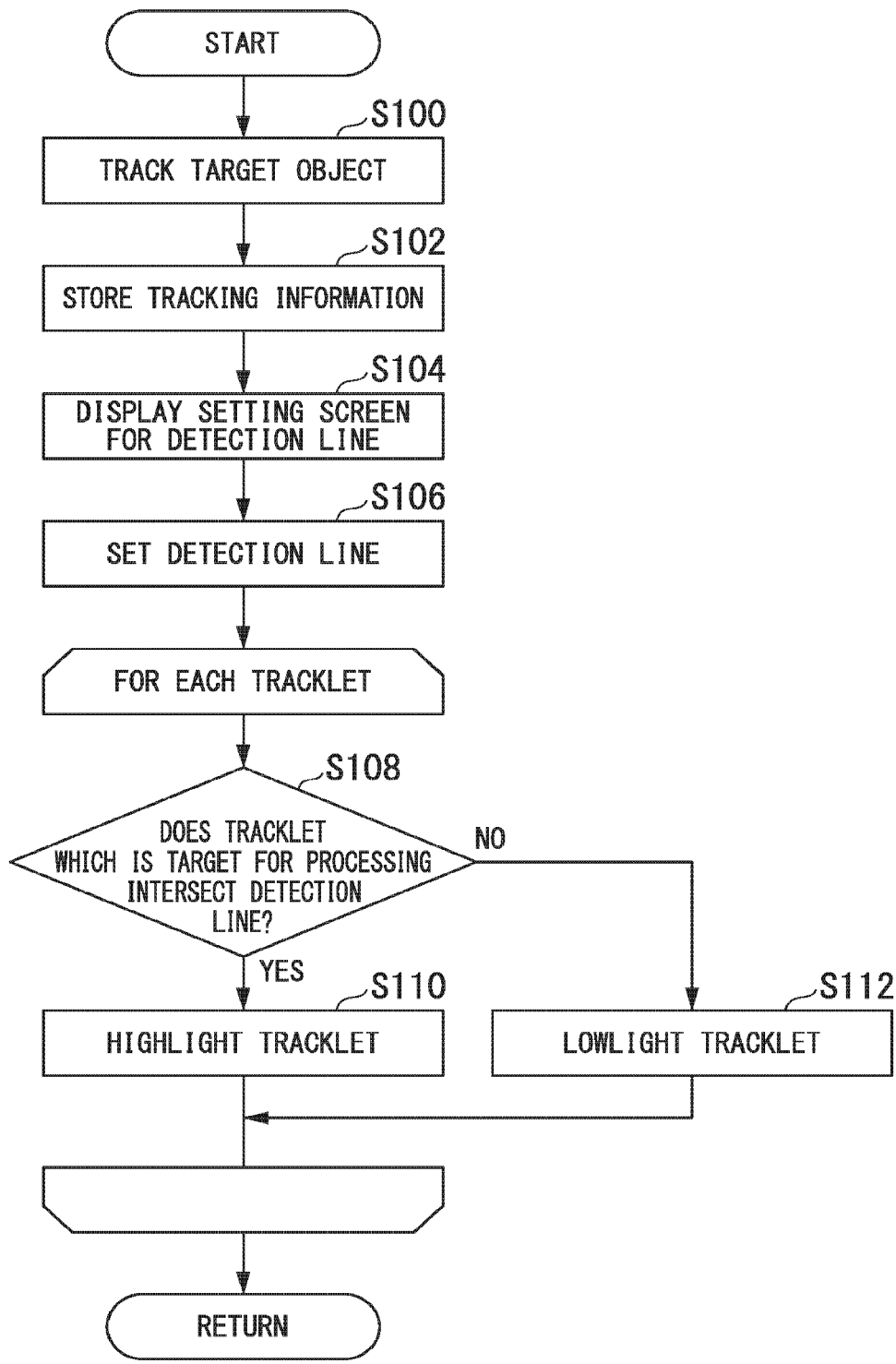
FIG. 3 is a flow diagram showing a flow of a series of processes performed by a controller of the first embodiment.

Hereinafter, the processing details of each component of the controller 110 of the first embodiment will be described with reference to a flow diagram. FIG. 3 is a flow diagram showing a flow of a series of processes performed by the controller 110 of the first embodiment. Processing of the present flow diagram may be repeated, for example, whenever a moving image is acquired from the camera 10.

First, the object-tracker 112 tracks a target object in a moving image acquired from the camera 10 (step S100). The target object may be, for example, the upper half of a human body, or a part of a face, a head or the like, and may be the whole body. For example, the object-tracker 112 sets a detection window $W_D$ in each frame constituting a moving image, and uses template matching for comparing an image region overlapping this detection window $W_D$ with a template image prepared in advance, to determine whether the image region overlapping the detection window $W_D$ is an image region reflecting a target object.

For example, the object-tracker 112 may perform template matching on the basis of parameters such as a hue, a luminance value, or a luminance gradient. For example, in a case where a parameter of a hue is used in template matching, the object-tracker 112 may determine that the image region overlapping the detection window $W_D$ is an image region reflecting a target object in a case where a difference between the hue of the image region overlapping of the detection window $W_D$ and the hue of the template image is equal to or less than a fixed value, and determines that the image region overlapping the detection window $W_D$ is a background image region in a case where the difference exceeds the fixed value. In addition, for example, in a case where a parameter of a luminance value or a luminance gradient is used in template matching, the object-tracker 112 may determine that the image region overlapping the detection window $W_D$ is an image region reflecting a target object in a case where a difference between the luminance value or the luminance gradient of the image region overlapping the detection window $W_D$ and the luminance value or the luminance gradient of the template image is equal to or less than a fixed value, and determines that the image region overlapping the detection window $W_D$ is a background image region in a case where the difference exceeds the fixed value.

The object-tracker 112 changes the position of the detection window $W_D$ after determining whether a region in which the detection window $W_D$ is set is an image region including a target object, and determines whether the region to which the position has been changed is an image region including a target object. The object-tracker 112 repeats such processes to thereby detect a target object from each frame while scanning the detection window $W_D$ in the two-dimensional direction of a frame.

The object-tracker 112 compares the positions of target objects detected in each frame between a plurality of frames consecutive in a time-series manner, determines that these target objects are the same object in a case where a distance (distance on an image plane) between the positions which are targets for comparison is less than a predetermined distance, and determines that these target objects are different from each other object in a case where a distance between the positions of the target objects which are targets for comparison is equal to or greater than the predetermined distance. The predetermined distance may, for example, be made shorter as the frame rate of a moving image becomes higher, and may be made longer as the frame rate becomes lower.

In addition, in a case where the shapes of target objects which are targets for comparison are more than a certain degree similar to each other, the object-tracker 112 may determine that these target objects are the same object. For example, in a case where a difference between hues, luminance values, luminance gradients or the like is equal to or less than a fixed value, the object-tracker 112 may determine that the shapes of the target objects are similar to each other.

In addition, in a case where the position of a target object is detected from each of a plurality of frames of a moving image acquired for a certain period in the past, the object-tracker 112 may obtain an optical flow on the basis of the detected positions of the target object, predict the position of a target object at a certain time in the future on the basis of the optical flow, compare the predicted position with the position of a target object detected in reality at that time, and determine whether these target objects are the same object.

The object-tracker 112 links, between frames, representative points such as the centroids of detection windows $W_D$ set with respect to each frame when target objects determined to be the same object are detected, and derives a line obtained by linking the representative points between these frames as a tracklet TL. Meanwhile, in a case where a plurality of target objects are detected in each of a plurality of frames in a result of scanning the detection window $W_D$, the object-tracker 112 may derive a plurality of tracklets TL. The tracklet TL is assumed to show, for example, the moving direction of an object.

Next, the storage controller 114 superimposes one or more tracklets TL derived by the object-tracker 112 on one frame which is representative (for example, a frame of the latest time) among a plurality of frames referred to when the tracklets TL are derived, and stores information (hereinafter, called tracking information) including the representative frame on which the one or more tracklets TL are superimposed, in the storage 130 (step S102). In addition, the storage controller 114 may control the communicator 102 such that the tracking information is stored in an external storage device on a network.

Next, the output controller 116 causes the display 104 to display a setting screen for the detection line $LN_D$ (step S104). The setting screen for the detection line $LN_D$ is, for example, a graphical user interface (GUI) screen for accepting various types of input in order to set the detection line $LN_D$. For example, the output controller 116 may display a screen, as a GUI, which makes it possible to designate coordinates of a start point and an end point of the detection line $LN_D$ on a frame on which tracklets TL included in the tracking information are superimposed.

Next, the detection region-setter 118 sets a detection line $LN_D$ for detecting passing through of a target object on the basis of the tracklet TL included in the tracking information, in a frame on which tracklets TL are superimposed, in accordance with a user's operation of the operator 106 (step S106).

The detection line $LN_D$ may be an approximative line obtained by linking one or more pixels in an image (frame), and may be a line that does not have a width geometrically defined as a function of a straight line or a curved line. In a case of the former, the detection line $LN_D$ may be a line having at least one pixel's worth of width.

For example, when a frame on which tracklets TL are superimposed is displayed as a setting screen on the display 104, a user may operate the operator 106 while viewing this screen, and designate a plurality of position coordinates on the frame on which tracklets TL are superimposed. For example, in a case where coordinates of two points are designated by a user, the detection region-setter 118 may set a straight line connecting these two points as a detection line $LN_D$. In addition, for example, in a case where coordinates of two or more points are designated by a user, the detection region-setter 118 may set a curve in which squares of distances from these points are a minimum, as a detection line $LN_D$. The straight line or the curved line may be a one-dimensional line that does not have a width geometrically defined as a function, and may be a linear two-dimensional region in which several pixels are formed together in a width direction.

In addition, the detection region-setter 118 may set a detection region $R_D$ which is a two-dimensional region instead of setting the detection line $LN_D$ of a straight line or a curved line. The detection region $R_D$ is, for example, a region which is set as a subspace (two-dimensional space) of a frame on which tracklets TL are superimposed, and is a space in which the length and breadth of a frame are represented as dimensions. For example, in a case where coordinates of three or more points are designated by a user, the detection region-setter 118 may set a polygonal region obtained by linking each point with a straight line, as a detection region $R_D$, using each point as a vertex. In addition, the detection region-setter 118 may set a stereoscopic three-dimensional detection region $R_D$ in which each point having coordinates designated by a user is used as a vertex. In the following description, as an example, a description will be given of a case where the detection region-setter 118 sets a one-dimensional detection line $LN_D$.

Next, the evaluation and analyzer 120 evaluates a setting mode for the detection line $LN_D$ with respect to each of one or more tracklets TL included in the tracking information, on the basis of the tracking information stored in the storage 130 or the external storage device and the detection line $LN_D$ set by the detection region-setter 118. In a case where the detection line $LN_D$ which is a one-dimensional detection region $R_D$ is set, the setting mode is, for example, the position of the detection line $LN_D$, the length of the detection line $LN_D$, the bending state of the detection line $LN_D$, or the like. In addition, in a case where a two-or-more-dimensional detection region $R_D$ is set, the setting mode is, for example, the position of the detection region $R_D$, the area (volume) of the detection region $R_D$, the shape of the detection region $R_D$, or the like.

For example, the evaluation and analyzer 120 selects any one tracklet TL, as a processing target, from among one or more tracklets TL included in the tracking information, and determines whether this tracklet TL which is a target for processing and the detection line $LN_D$ intersect each other (step S108). The wording "intersect each other" means that, for example, the tracklet TL enters a pixel region including one or more pixels indicating the detection line $LN_D$, and then leaves the pixel region.

Figure 4:
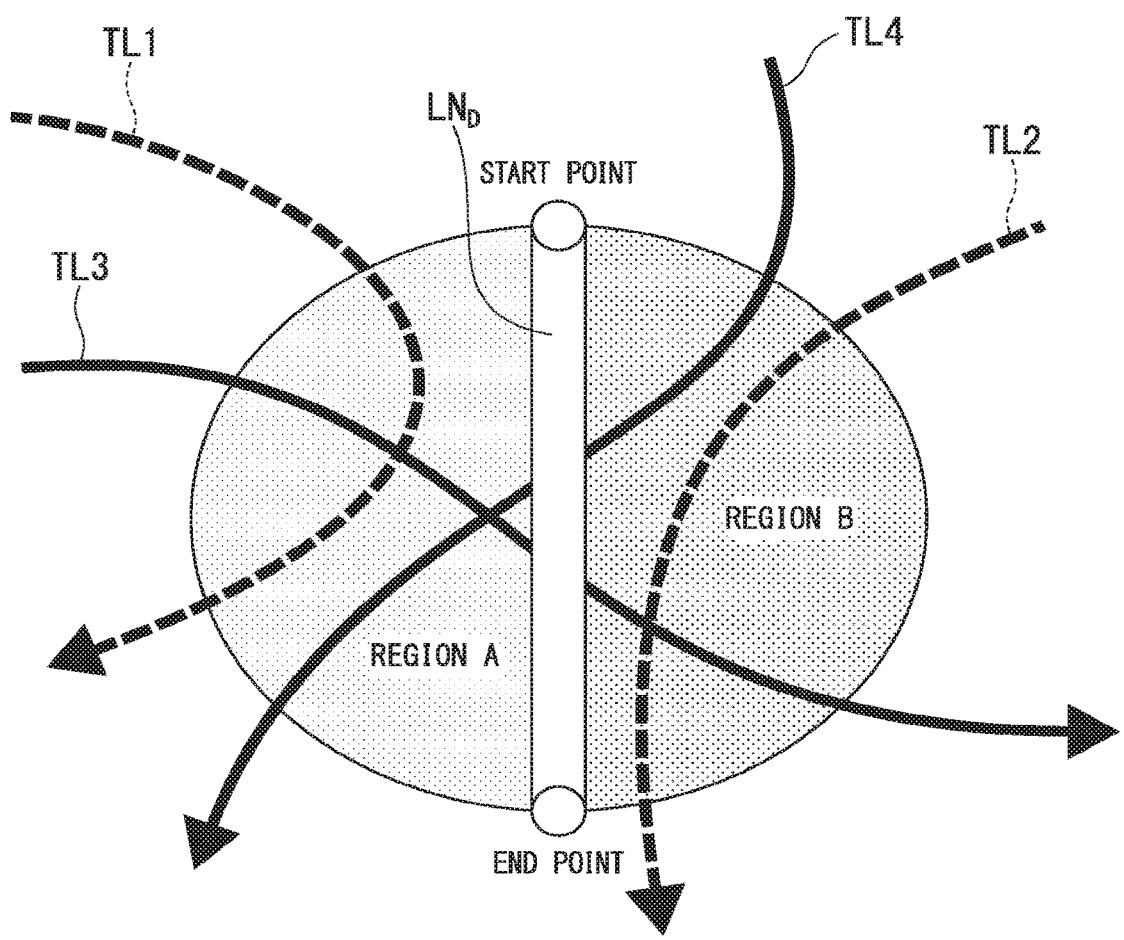
FIG. 4 is a diagram showing a method of determining the presence or absence of intersection between a detection line and tracklets.

FIG. 4 is a diagram showing a method of determining the presence or absence of intersection between the detection line $LN_D$ and tracklets TL. For example, in a case where the detection line $LN_D$ is represented as a line having a width equivalent to several pixels to several tens of pixels, the evaluation and analyzer 120 may set a circle (ellipse) passing through a start point and an end point of the detection line $LN_D$, and determines whether the tracklets TL and the detection line $LN_D$ intersect each other on the basis of two regions (regions A and B in the drawing) separated by the detection line $LN_D$ among regions within this circle. For example, the evaluation and analyzer 120 may determine a tracklet TL that does not enter from one of the regions separated into two parts by the detection line $LN_D$ to the other region, within the set circle, like a tracklet TL1 or TL2, as a tracklet TL that does not intersect the detection line $LN_D$. In addition, the evaluation and analyzer 120 determines a tracklet TL that enters from one of the regions separated into two parts by the detection line $LN_D$ to the other region, within the set circle, like a tracklet TL3 or TL4, as a tracklet TL that intersects the detection line $LN_D$.

In addition, in a case where the detection line $LN_D$ is represented as a line having one pixel's worth of width, the evaluation and analyzer 120 determines that the tracklet TL and the detection line $LN_D$ intersect each other in a case where the fact that two pixels (for example, adjacent pixels on the left side and the lower side) located on a diagonal line among four pixels which are vertically and horizontally adjacent to a certain pixel to be focused upon among a plurality of pixels indicating the detection line $LN_D$ are pixels indicating the tracklet TL is established with respect to two or more pixels among a plurality of pixels indicating the detection line $LN_D$.

Figure 5:
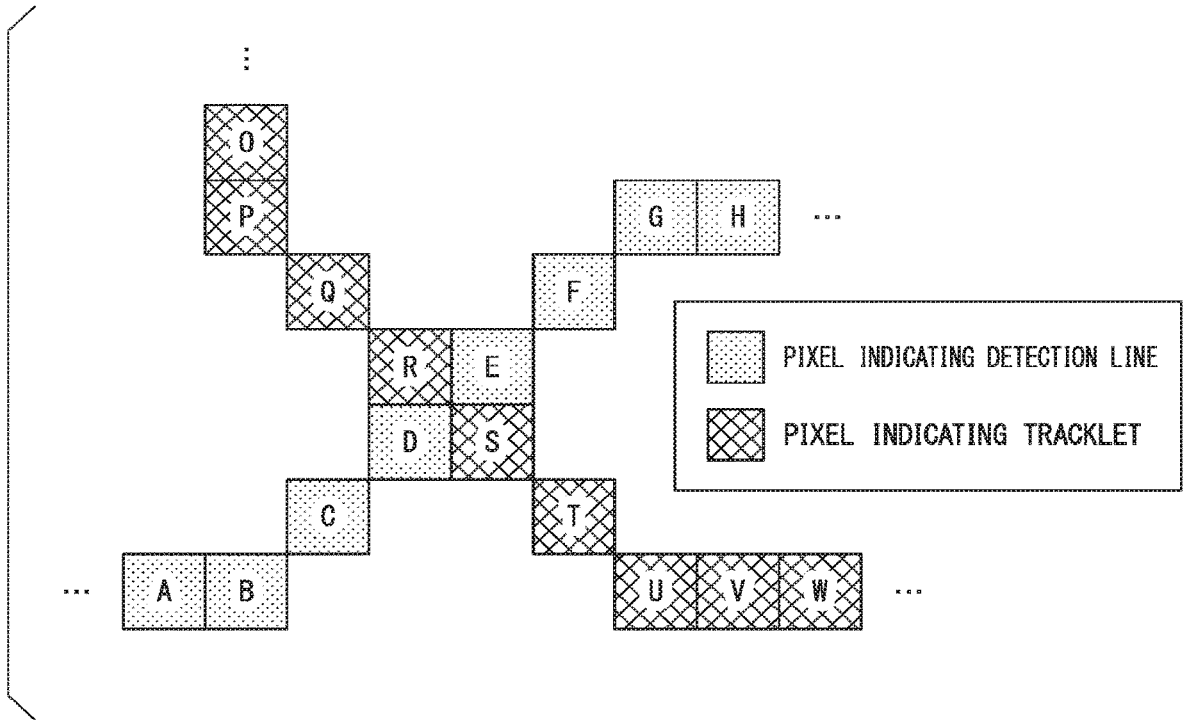
FIG. 5 is a diagram showing a method of determining the presence or absence of intersection between the detection line and tracklets.
Figure 6:
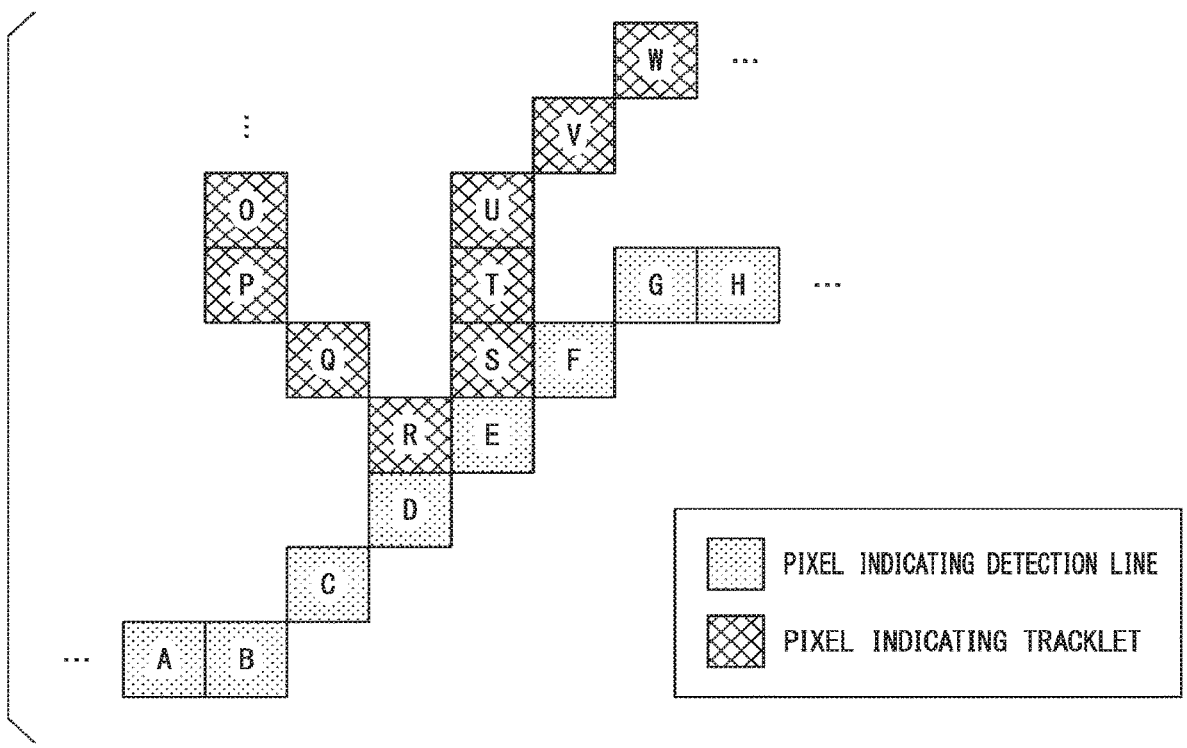
FIG. 6 is a diagram showing a method of determining the presence or absence of intersection between the detection line and tracklets.

FIGS. 5 and 6 are diagrams illustrating a method of determining the presence or absence of intersection between the detection line $LN_D$ and the tracklet TL. In the example of each drawing, the detection line $LN_D$ and the tracklet TL are represented as one pixel's worth of image region. Further, the detection line $LN_D$ is represented by pixels A to H, and the tracklet TL is represented by pixels O to W. As illustrated in FIG. 5, in a case of being focusing on two pixels D and E among the pixels indicating the detection line $LN_D$, an adjacent pixel located on the side above this pixel D focused upon and an adjacent pixel located on the left side of the pixel E focused upon are set to the pixel R which is one of the pixels indicating the tracklet TL, and an adjacent pixel located on the right side of the pixel D focused upon and an adjacent pixel located on the side below the pixel E focused upon are set to the pixel S which is one of the pixels indicating the tracklet TL. In such a case, the evaluation and analyzer 120 determines that the detection line $LN_D$ and the tracklet TL intersect each other.

On the other hand, as illustrated in FIG. 6, in a case of being focusing on two pixels D and E among the pixels indicating the detection line $LN_D$, an adjacent pixel located on the side above this pixel D focused upon and an adjacent pixel located on the left side of the pixel E focused upon are set to the pixel R which is one of the pixels indicating the tracklet TL, but adjacent pixels other than the pixel D focused upon are not set to pixels indicating the tracklet TL. In such a case, the evaluation and analyzer 120 determines that the detection line $LN_D$ and the tracklet TL do not intersect each other.

The evaluation and analyzer 120 makes different evaluations of the setting mode for the detection line $LN_D$ in a case where the tracklet TL and the detection line $LN_D$ intersect each other and a case where the tracklet TL and the detection line $LN_D$ do not intersect each other. For example, in a case where the tracklet TL and the detection line $LN_D$ intersect each other, the evaluation and analyzer 120 may evaluate a higher setting mode for the detection line $LN_D$ than in a case where the tracklet TL and the detection line $LN_D$ do not intersect each other.

The output controller 116 changes a display mode for the tracking information on the basis of the evaluation result of the evaluation and analyzer 120. For example, since evaluations are different from each other in a case where the tracklet TL and the detection line $LN_D$ intersect each other and a case where the tracklet TL and the detection line $LN_D$ do not intersect each other, the output controller 116 makes the display modes for the detection line $LN_D$ different from each other in these respective cases.

For example, in a case where it is determined by the evaluation and analyzer 120 that the tracklet TL and the detection line $LN_D$ intersect each other, the output controller 116 may cause the display 104 to highlight a tracklet TL intersecting the detection line $LN_D$ (step S110). The highlighting may be to change, for example, the display color of the tracklet TL to other colors. In addition, for example, instead of or in addition to changing the color of the tracklet TL, the highlighting may be to further increase an element value such as brightness, chroma, or luminance, may be to further increase the line thickness of the tracklet TL, may be to decrease the line transparency of the tracklet TL, and may be to change the texture of the tracklet TL.

On the other hand, in a case where it is determined by the evaluation and analyzer 120 that the tracklet TL and the detection line $LN_D$ do not intersect each other, the output controller 116 causes the display 104 to lowlight a tracklet TL not intersecting the detection line $LN_D$ (step S112). The lowlighting is to, for example, maintain the current color without changing the display color of the tracklet TL to other colors. In addition, the lowlighting may be to, for example, reduce an element value such as brightness, chroma, or luminance of the display color of the tracklet TL compared with during highlighting, may be to reduce the line thickness of the tracklet TL compared with during highlighting, and may be to increase the line transparency of the tracklet TL compared with during highlighting.

Figure 7:
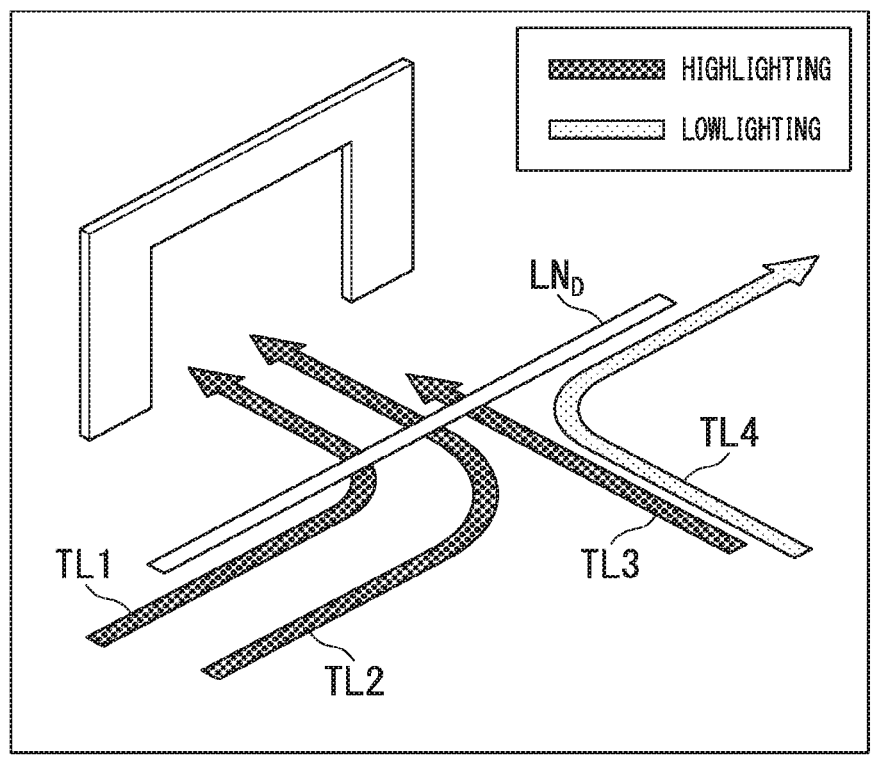
FIG. 7 is a diagram showing a method of displaying tracklets.

FIGS. 7 to 10 are diagrams illustrating a method of displaying tracklets TL. In the example of FIG. 7, among four tracklets TL, tracklets TL1, TL2, and TL3 intersects the detection line $LN_D$, and a tracklet TL4 does not intersect the detection line $LN_D$. In this case, for example, the output controller 116 may cause the display 104 to highlight the tracklets TL1, TL2, and TL3 by making their display colors red, and to lowlight the tracklet TL4 by making its display color gray.

Figure 8:
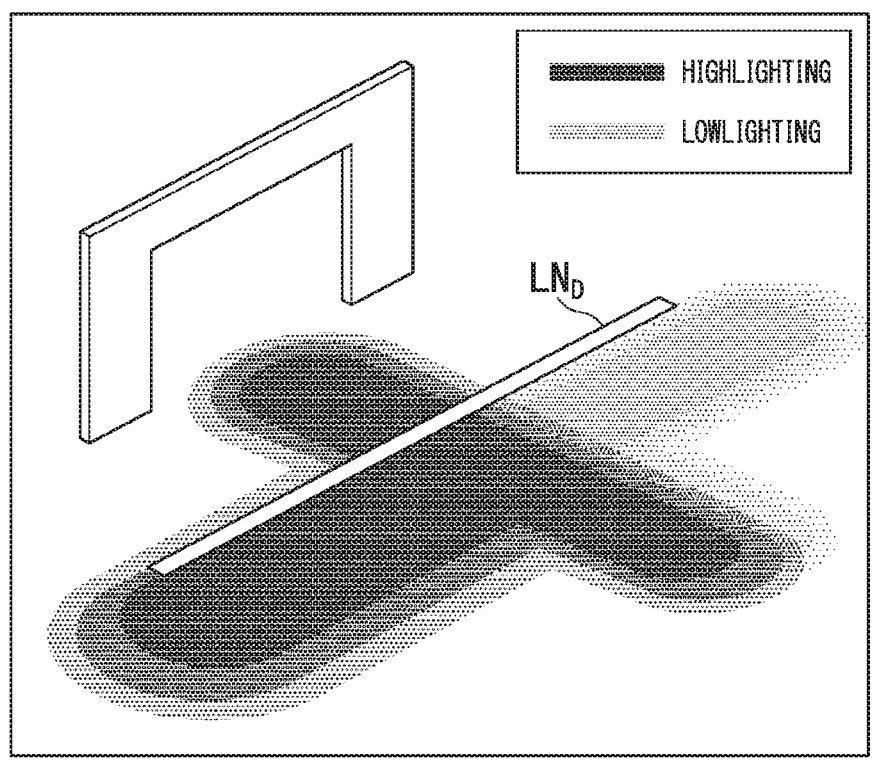
FIG. 8 is a diagram showing a method of displaying tracklets.
Figure 9:
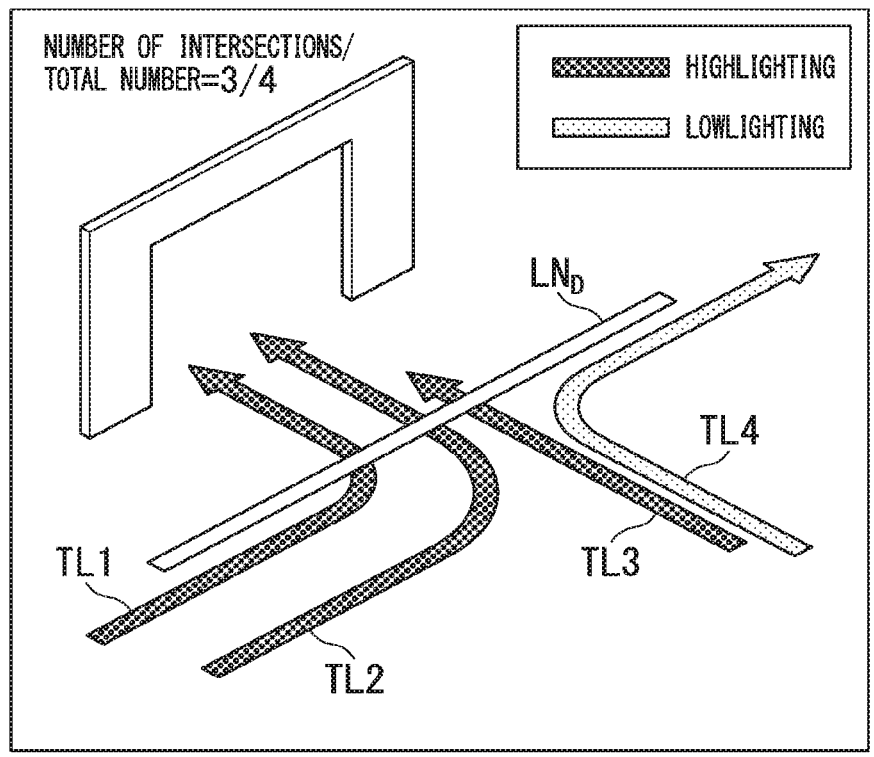
FIG. 9 is a diagram showing a method of displaying tracklets.

In addition, the output controller 116 may cause the display 104 to display the tracklets TL as a heat map as shown in FIG. 8, and may cause the display 104 to display a numerical value indicating the ratio of the number of tracklets TL intersecting the detection line $LN_D$ to the total number of tracklets TL as shown in FIG. 9.

Figure 10:
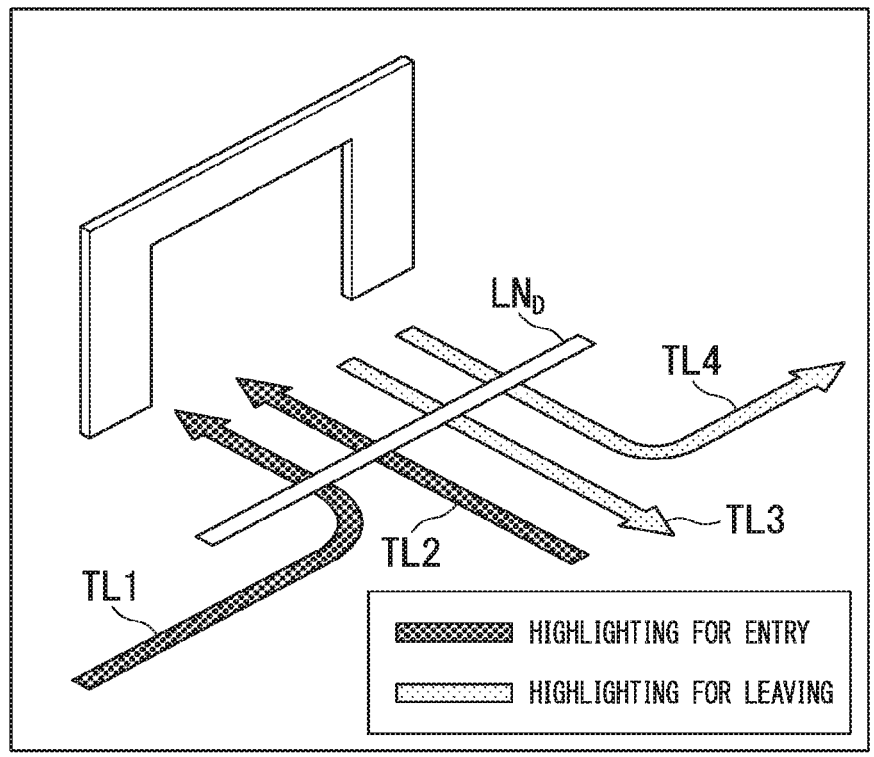
FIG. 10 is a diagram showing a method of displaying tracklets.

In addition, the output controller 116 may change display modes in accordance with the directions of the tracklets TL. For example, as shown in FIG. 10, the output controller 116 may highlight each of the tracklets TL by making display colors red with respect to tracklets TL of which the moving directions (directions of arrows in the drawing) are into the entrance port, and making display colors blue with respect to tracklets TL of which the moving directions are out from the entrance port.

The controller 110 terminates the processing of the present flow diagram in a case where intersection with the detection line $LN_D$ is determined with respect to all the tracklets TL, changes tracklets TL which are targets for processing in a case where intersection with the detection line $LN_D$ is not determined with respect to all the tracklets TL, and repeats the processes of S108 to S112.

Meanwhile, in the processing of the flow diagram described above, the evaluation and analyzer 120 may determine whether the tracklet TL and the detection region $R_D$ intersect each other in a case where a two-dimensional or three-dimensional detection region $R_D$ is set by the detection region-setter 118 instead of the one-dimensional detection line $LN_D$. The term "intersect" refers to, for example, a positional relationship in which the tracklet TL and the detection region $R_D$ intrude into each other.

According to the first embodiment described above, a target object is tracked in a moving image, tracking information including a tracklet TL which is a movement trajectory of the tracked object is stored in the storage 130 or the external storage device, a detection line $LN_D$ or a detection region $R_D$ for detecting passing through of an object is set in a frame within the moving image on the basis of the tracklet TL included in the tracking information, a setting mode for the detection line $LN_D$ or the detection region $R_D$ is evaluated on the basis of this set detection line $LN_D$ or detection region $R_D$ and the tracklet TL, and the tracking information is output in an output mode based on the evaluation result, whereby it is possible to improve the accuracy of detection of an entering or leaving person.

For example, in a technique disclosed in Patent Document 1, a user is presented with a recommended region for setting a detection line $LN_D$ with reference to the past person's tracklet TL. However, in a case where there is a person passing through a place other than an entrance port such as, for example, a person passing by the entrance port, there is a problem in that it may not be possible to present a correct recommended region, which leads to a decrease in the accuracy of detection of an object. In addition, in a case of a technique disclosed in Patent Document 2, generally, a screen end region in which there is a decrease in the accuracy of detection of a tracklet TL of a tracked person is set to a setting forbidden region. However, a problem occurs in that a situation in which there is a person passing through a place other than an entrance port can occur even in a region at the center of a screen, which leads to a decrease in the accuracy of detection of an object.

On the other hand, in the present embodiment, it is possible to cause a user to confirm whether a past tracklet TL can be correctly detected using the detection line $LN_D$ or the detection region $R_D$ set in accordance with the user's operation, and thus it is possible to cause the user to set the detection line $LN_D$ or the like again, for example, so as not to intersect the tracklet TL of a person passing through a place other than an entrance port. As a result, even in a case where there is a person passing through a place other than an entrance port, it is possible to detect a person who enters an entrance port or leaves the entrance port with a good degree of accuracy.

Second Embodiment

Hereinafter, a second embodiment will be described. The second embodiment is different from the first embodiment in that it is determined whether tracklets TL selected by a user among a plurality of tracklets TL intersect the detection line $LN_D$ or the detection region $R_D$, and a setting mode for the detection line $LN_D$ or the detection region $R_D$ is evaluated for each of the tracklets TL selected by the user, on the basis of the determination result. Hereinafter, a description will be given with focus on differences from the first embodiment, and common parts with respect to those in the first embodiment will not be described.

Figure 11:
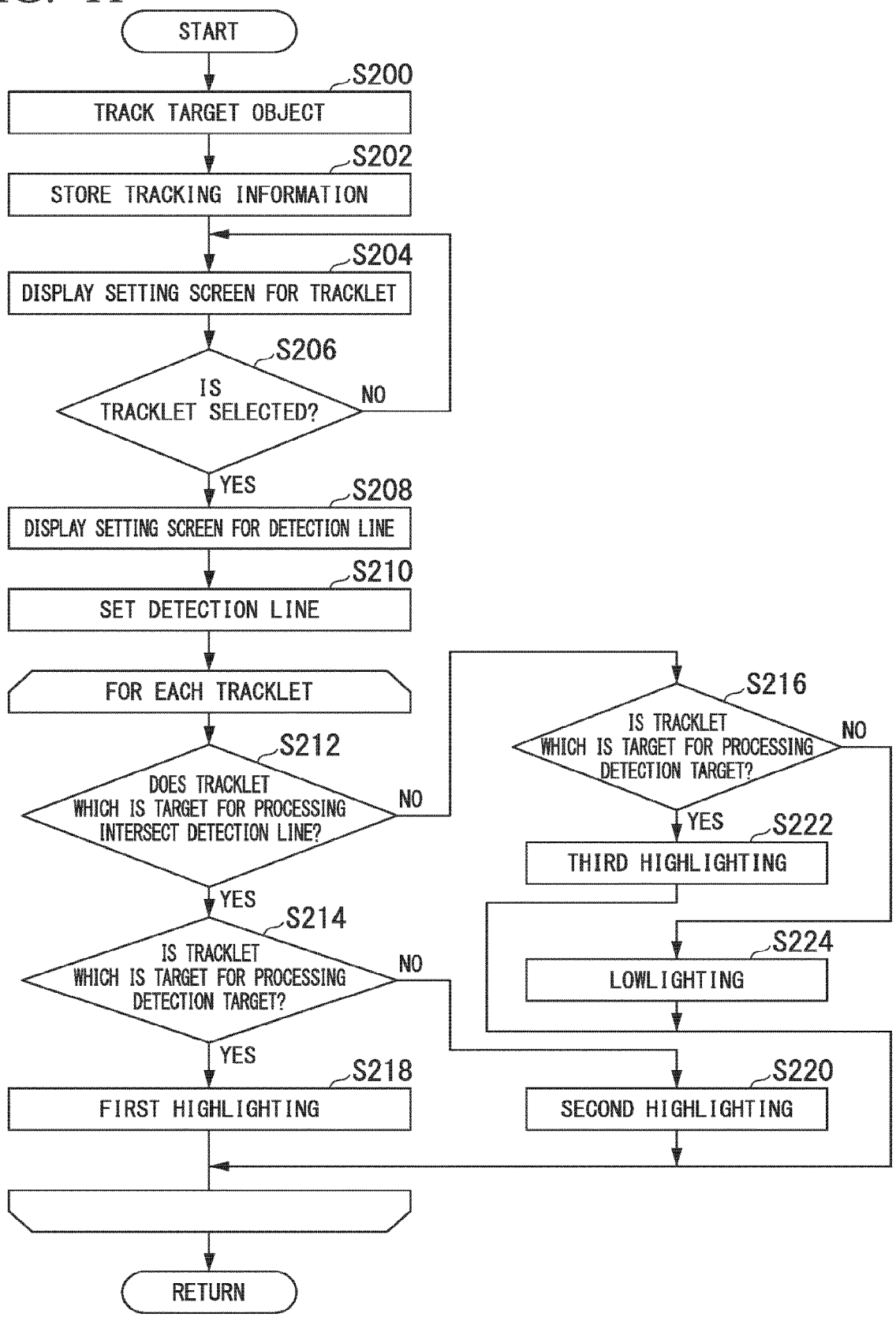
FIG. 11 is a flow diagram showing a flow of a series of processes performed by a controller of a second embodiment.

FIG. 11 is a flow diagram showing a flow of a series of processes performed by a controller 110 of the second embodiment. Processing of the present flow diagram may be repeated, for example, whenever a moving image is acquired from the camera 10.

First, the object-tracker 112 tracks a target object in a moving image acquired from the camera 10 (step S200). Next, the storage controller 114 superimposes one or more tracklets TL derived by the object-tracker 112 in order to track a target object, on one frame which is representative among a plurality of frames referred to when the tracklets TL are derived, and cause the storage 130 or the like to store tracking information including the representative frame on which the one or more tracklets TL are superimposed (step S202).

Next, the output controller 116 causes the display 104 to display a selection screen for tracklets TL (step S204). The selection screen for tracklets TL is, for example, a screen for causing a user to select a tracklet TL (tracklet TL which is a target for detection) desired to be detected using the detection line $LN_D$ or the detection region $R_D$ from among all the tracklets TL derived by the object-tracker 112.

Figure 12:
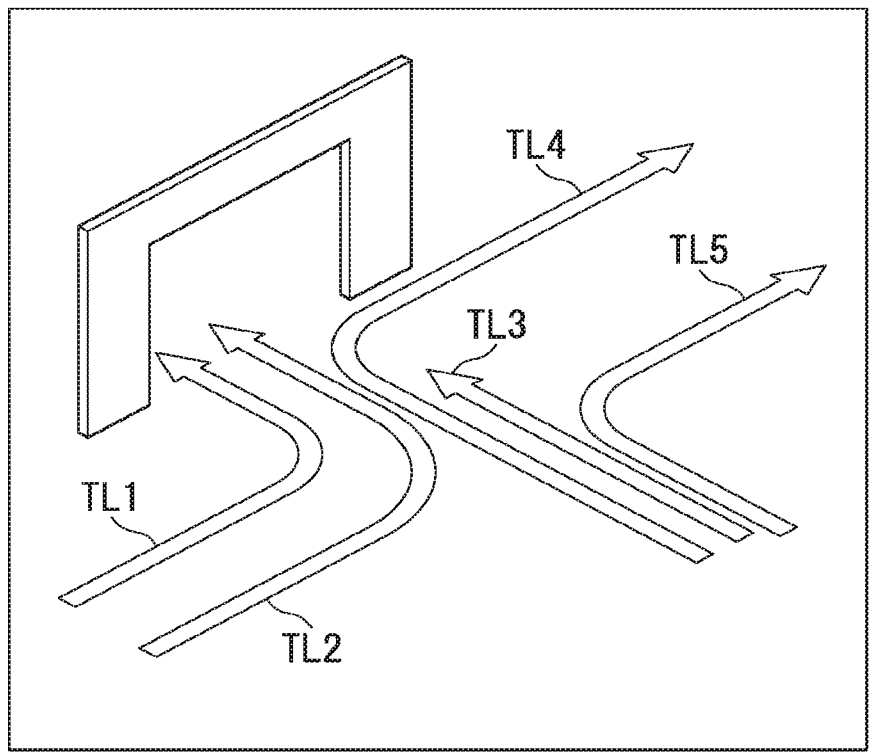
FIG. 12 is a diagram showing an example of a selection screen for tracklets.

FIG. 12 is a diagram showing an example of a selection screen for tracklets TL. In a case where the screen of the shown example is displayed, a user operates the operator 106, and selects one or more tracklet TL, as tracklets TL which are targets for detection, from among five tracklets TL.

Next, the output controller 116 causes the display 104 to display the selection screen for tracklets TL followed by determining whether one or more tracklets TL have been selected by a user (step S206), and causes the display 104 to display a setting screen for the detection line $LN_D$ in a case where one or more tracklets TL are selected by the user (step S208).

Figure 13:
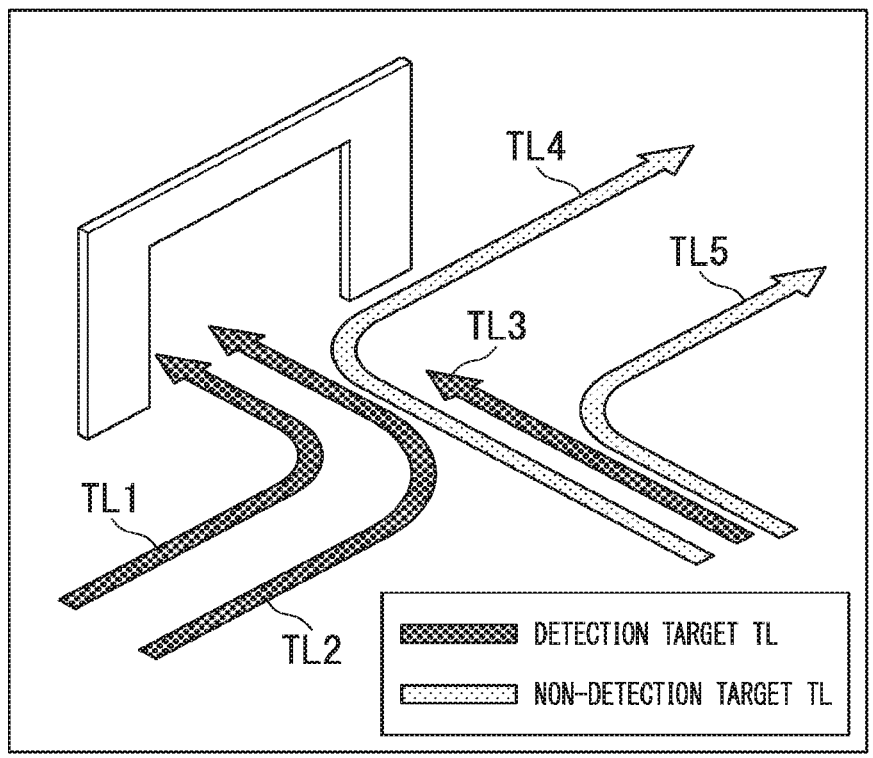
FIG. 13 is a diagram showing an example of a setting screen for the detection line.

FIG. 13 is a diagram showing an example of a setting screen for the detection line $LN_D$. In the shown example, tracklets TL1, TL2, and TL3 are selected as tracklets TL which are targets for detection, and the remaining tracklets TL4 and TL5 which are not selected are set to tracklets TL which are targets for non-detection. In this case, the output controller 116 may make display modes for the tracklets TL which are targets for detection and the tracklets TL which are targets for non-detection different from each other. For example, the output controller 116 may make the display color of the tracklets TL which are targets for detection red, and make the display color of the tracklets TL which are targets for non-detection gray. Thereby, a user can set the detection line $LN_D$ while confirming which tracklets TL the detection line may be caused to intersect.

Next, the evaluation and analyzer 120 selects any one tracklet TL, as a processing target, from among one or more tracklets TL included in the tracking information, and determines whether this tracklet TL which is a target for processing and the detection line $LN_D$ intersect each other (step S212).

Next, in a case where it is determined that the tracklet TL which is a target for processing and the detection line $LN_D$ intersect each other, the evaluation and analyzer 120 further determines whether the tracklet TL which is a target for processing is a tracklet TL selected as a detection target by a user (step S214).

On the other hand, in a case where it is determined that the tracklet TL which is a target for processing and the detection line $LN_D$ do not intersect each other, the evaluation and analyzer 120 further determines whether the tracklet TL which is a target for processing is a tracklet TL selected as a detection target by a user (step S216).

The evaluation and analyzer 120 evaluates the setting mode for the detection line $LN_D$ for each tracklet TL, on the basis of these various types of determination result.

For example, the evaluation and analyzer 120 may evaluate a high setting mode for the detection line $LN_D$ with respect to tracklets TL that intersect the detection line $LN_D$ among one or more tracklets TL selected as detection targets by a user, and evaluate a low setting mode for the detection line $LN_D$ with respect to tracklets TL that do not intersect the detection line $LN_D$.

In addition, for example, the evaluation and analyzer 120 evaluates a low setting mode for the detection line $LN_D$ with respect to tracklets TL that intersect the detection line $LN_D$ among one or more tracklets TL which are targets for non-detection and are not selected as detection targets by a user, and evaluates a high setting mode for the detection line $LN_D$ with respect to tracklets TL that do not intersect the detection line $LN_D$.

Figure 14:
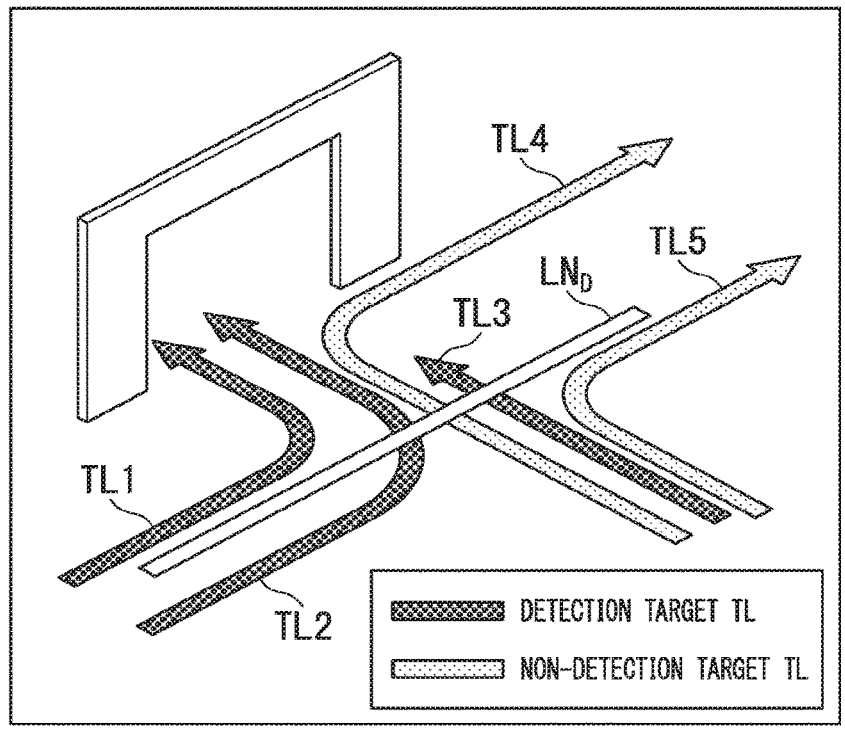
FIG. 14 is a diagram showing an example of a screen on which the detection line is set.

FIG. 14 is a diagram showing an example of a screen on which the detection line $LN_D$ is set. In the shown example, the set detection line $LN_D$ is drawn with respect to frames in which the tracklets TL1, TL2, and TL3 are selected as tracklets TL which are targets for detection. The tracklets TL2 and TL3 which are targets for detection intersect this set detection line $LN_D$, and the tracklet TL4 which is a target for non-detection intersects the set detection line. That is, the tracklets TL2 and TL3 which are targets for detection are in a "correctly detected state" which is being detected by the detection line $LN_D$ as desired by a user, and the tracklet TL4 which is a target for non-detection is in an "over-detected state" which is being detected by the detection line $LN_D$ in spite of this not being desired by a user.

In addition, the tracklet TL1 which is a target for detection does not intersect the detection line $LN_D$, and the tracklet TL5 which is a target for non-detection does not intersect the detection line. That is, the tracklet TL1 which is a target for detection is in a "non-detected state" which is not being detected by the detection line $LN_D$ in spite of this being desired by a user, and the tracklet TL5 which is a target for non-detection is in a "correctly non-detected state" which is not being detected by the detection line $LN_D$ as desired by a user.

In such a case, the evaluation and analyzer 120 evaluates a high setting mode for the detection line $LN_D$ with respect to the tracklets TL2 and TL3 which are targets for detection in the "correctly detected state" and the tracklet TL5 which is a target for non-detection in the "correctly non-detected state", and evaluates a low setting mode for the detection line $LN_D$ with respect to the tracklet TL1 which is a target for detection in the "non-detected state" and the tracklet TL4 which is a target for non-detection in the "over-detected state".

The output controller 116 changes the display modes for tracklets TL on the basis of the evaluation results of the setting modes for the detection line $LN_D$ with respect to these respective tracklets TL.

For example, in a case where it is determined by the evaluation and analyzer 120 that the tracklet TL which is a target for processing intersects the detection line $LN_D$, and is a tracklet TL which is a target for detection, that is, in a case of being in the "correctly detected state", the output controller 116 causes the display 104 to perform first highlighting on the tracklet TL which is a target for processing (step S218). The first highlighting refers to, for example, greater highlighting than in other display modes such as second highlighting or third highlighting described later.

In addition, in a case where it is determined by the evaluation and analyzer 120 that the tracklet TL which is a target for processing intersects detection line $LN_D$, and is not a tracklet TL which is a target for detection, that is, in a case of being in a "misdetected state", the output controller 116 causes the display 104 to perform second highlighting on the tracklet TL which is a target for processing (step S220). The second highlighting refers to, for example, the same degree of highlighting as third highlighting, or greater highlighting than the third highlighting.

In addition, in a case where it is determined by the evaluation and analyzer 120 that the tracklet TL which is a target for processing does not intersect the detection line $LN_D$, and is a tracklet TL which is a target for detection, that is, in a case of being in the "non-detected state", the output controller 116 causes the display 104 to perform third highlighting on the tracklet TL which is a target for processing (step S222). The third highlighting refers to, for example, greater highlighting than at least lowlighting.

In addition, in a case where it is determined by the evaluation and analyzer 120 that the tracklet TL which is a target for processing does not intersect the detection line $LN_D$, and is not a tracklet TL which is a target for detection, that is, in a case of being in the "correctly non-detected state", the output controller 116 causes the display 104 to lowlight the tracklet TL which is a target for processing (step S224).

Figure 15:
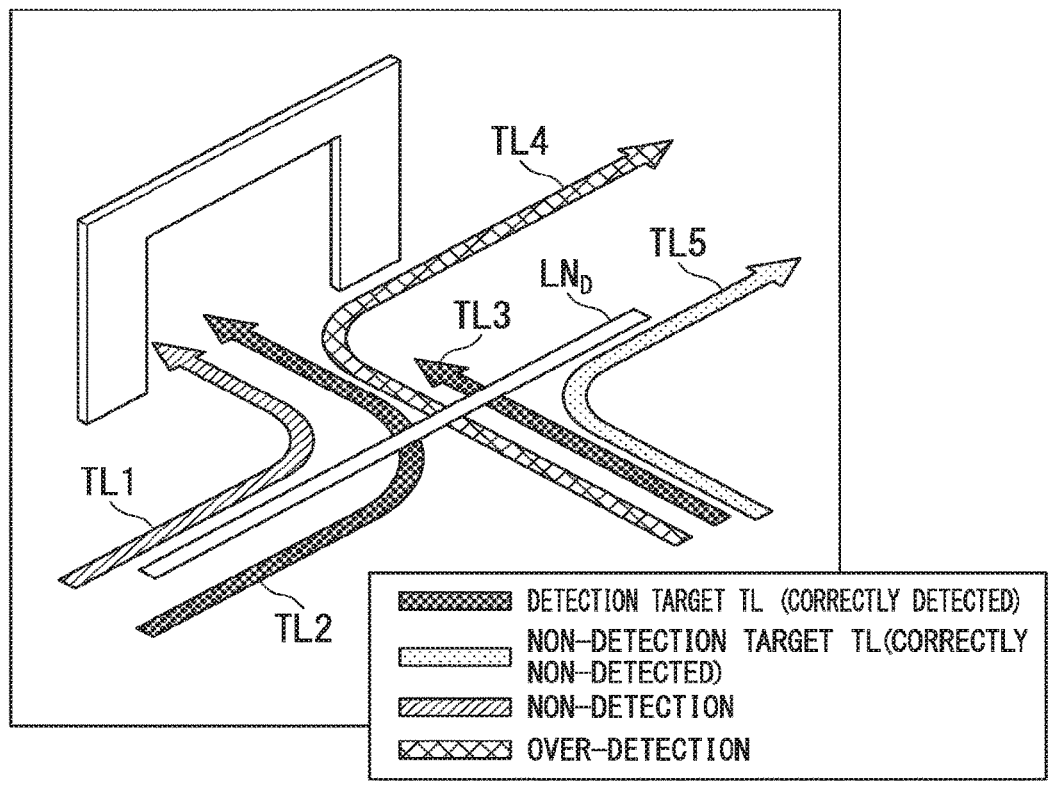
FIG. 15 is a diagram showing an example of tracklets displayed in a display mode based on each evaluation result.

FIG. 15 is a diagram showing an example of tracklets TL displayed in a display mode based on each evaluation result. As in the shown example, the output controller 116 may determine display modes (such as, for example, color or texture) for tracklets TL in accordance with each evaluation result of the detection line $LN_D$ with respect to each tracklet TL such as a "correctly detected state", a "misdetected state", a "non-detected state", and a "correctly non-detected state".

The controller 110 terminates the processing of the present flow diagram in a case where intersection with the detection line $LN_D$ is determined with respect to all the tracklets TL, changes tracklets TL which are targets for processing in a case where intersection with the detection line $LN_D$ is not determined with respect to all the tracklets TL, and repeats the processes of S212 to S224.

According to the second embodiment described above, it is determined whether tracklets TL selected by a user among a plurality of tracklets TL intersect the detection line $LN_D$ or the detection region $R_D$, and a setting mode for the detection line $LN_D$ or the detection region $R_D$ is evaluated for each of the tracklets TL selected by the user, on the basis of the determination result. Therefore, it is possible to present to a user whether a tracklet TL of a person tracked in the past can be correctly detected or is erroneously detected with respect to the detection line $LN_D$ or the like tentatively set by the user, and possible for the user himself (or herself) to determine whether the set detection line $LN_D$ or the like operates as intended by the user.

Third Embodiment

Hereinafter, a third embodiment will be described. The third embodiment is different from the first and second embodiments in that when the tracklet TL and the detection line $LN_D$ intersect each other, the setting mode for the detection line $LN_D$ is evaluated in accordance with an intersection position on the tracklet TL, an intersection position on the detection line $LN_D$, and some or all of the angles (included angles) between the tracklet TL and the detection line $LN_D$. Hereinafter, a description will be given with focus on differences from the first and second embodiments, and common parts with respect to those in the first and second embodiments will not be described.

Figure 16:
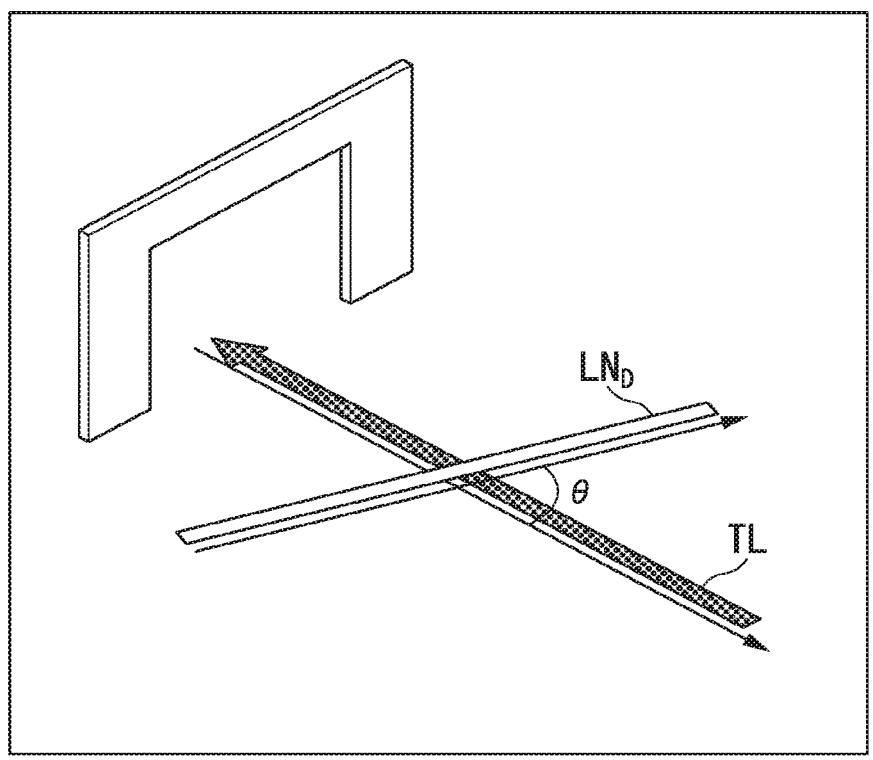
FIG. 16 is a diagram showing an evaluation method in a case where a tracklet and the detection line intersect each other.
Figure 17:
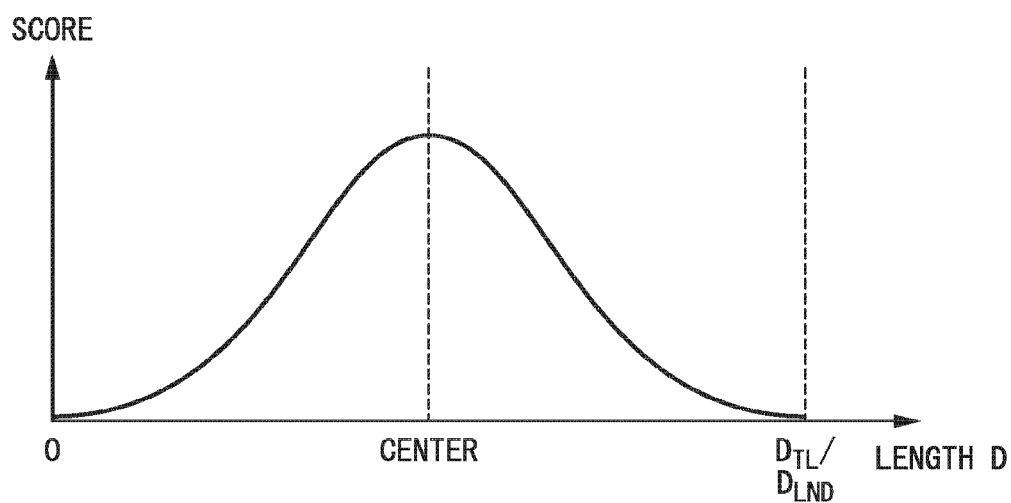
FIG. 17 is a diagram showing an evaluation method in a case where the tracklet and the detection line intersect each other.
Figure 18:
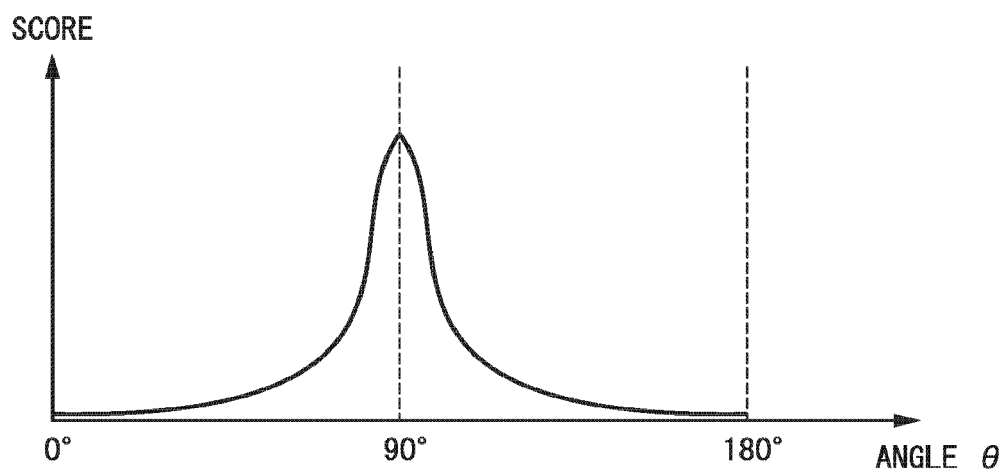
FIG. 18 is a diagram showing an evaluation method in a case where the tracklet and the detection line intersect each other.

FIGS. 16 to 18 are diagrams illustrating an evaluation method in a case where the tracklet TL and the detection line $LN_D$ intersect each other. For example, an end farthest from the midpoint of the tracklet TL is a position at which the tracking of a target object is interrupted. In a case where the detection line $LN_D$ is set in the vicinity of this end, a target object which is being tracked may be interrupted without passing through the detection line $LN_D$. Therefore, in order to stably detect passing through of a target object, it is preferable that the detection line $LN_D$ be set in the vicinity of the midpoint of the tracklet TL. For this reason, for example, in the tracklet TL, the evaluation and analyzer 120 of the third embodiment may increase a score obtained by quantifying the degree of evaluation as the point of intersection with the detection line $LN_D$ approaches the center (midpoint) of a length $D_{TL}$ of the tracklet TL, and may lower the score as the point of intersection with the detection line $LN_D$ becomes farther away from the center of the length $D_{TL}$ of the tracklet TL.

In addition, in a case where the end of the detection line $LN_D$ and the tracklet TL are set so as to intersect each other, a target object which is being tracked travels away from the detection line $LN_D$, and thus the target object may not be able to be detected. Therefore, in order to stably detect passing through of a target object, it is preferable that the vicinity of the midpoint of the detection line $LN_D$ and the tracklet TL be set so as to intersect each other. For this reason, for example, in the detection line $LN_D$, the evaluation and analyzer 120 may increase the score as the point of intersection with the tracklet TL approaches the center (midpoint) of a length $D_{LND}$ of the detection line $LN_D$, and may lower the score as the point of intersection with the tracklet TL becomes farther away from the center of the length $D_{LND}$ of the detection line $LN_D$.

In addition, in a case where the detection line $LN_D$ is set so as to be parallel to the tracklet TL, there is a decreasing probability of a target object which is being tracked passing through the detection line $LN_D$, and thus it is preferable that the detection line $LN_D$ be set so as to be orthogonal to the tracklet TL. For this reason, the evaluation and analyzer 120 may increase the score, for example, as an angle θ between the tracklet TL and the detection line $LN_D$ approaches 90 degrees, and may lower the score as the angle θ approaches 0 degrees or 180 degrees.

The evaluation and analyzer 120 evaluates a setting mode for a final detection line $LN_D$ on the basis of some or all of a score (hereinafter, called a first score) obtained by evaluating the position of the point of intersection with the detection line $LN_D$ on the tracklet TL, a score (hereinafter, called a second score) obtained by evaluating the position of the point of intersection with the tracklet TL on the detection line $LN_D$, and a score (hereinafter, called a third score) obtained by evaluating the angle θ between the tracklet TL and the detection line $LN_D$. For example, in a case where all the scores are referred to, the evaluation and analyzer 120 may evaluate a highest setting mode in which a weighted sum of these scores becomes maximum. In this case, the evaluation and analyzer 120 evaluates a highest setting mode for the detection line $LN_D$ set by a user in a case where the center of the tracklet TL and the center of the detection line $LN_D$ intersect each other in a state where the tracklet TL and the detection line $LN_D$ are orthogonal to each other.

Figure 19:
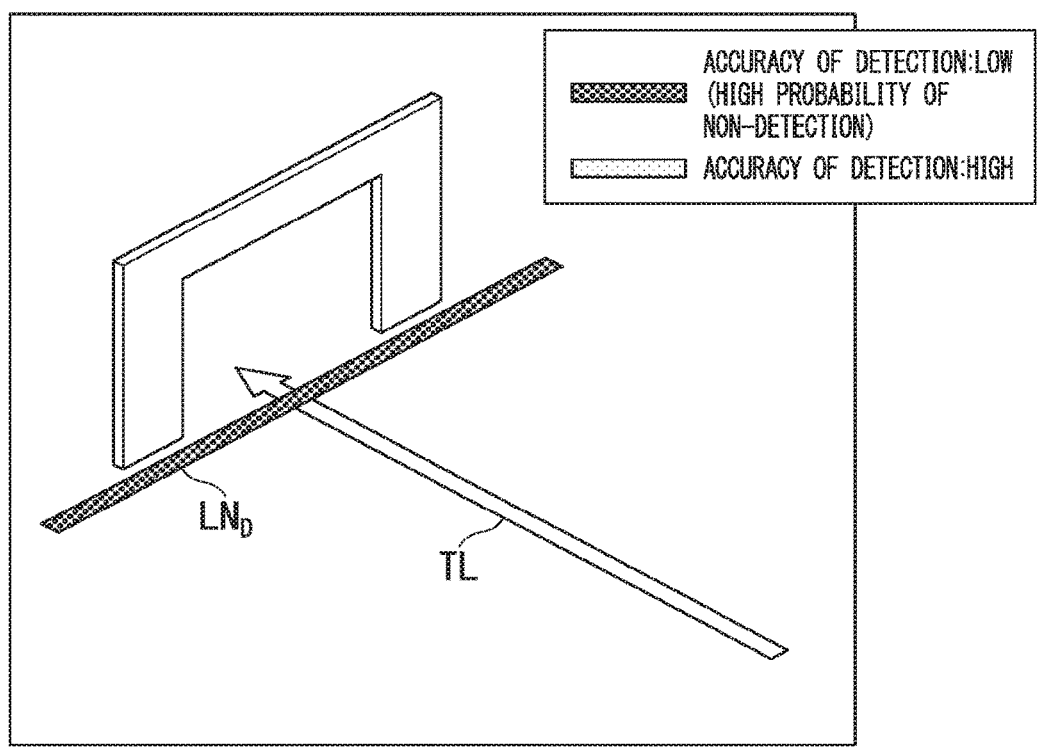
FIG. 19 is a diagram showing an example of a setting mode for the detection line.
Figure 20:
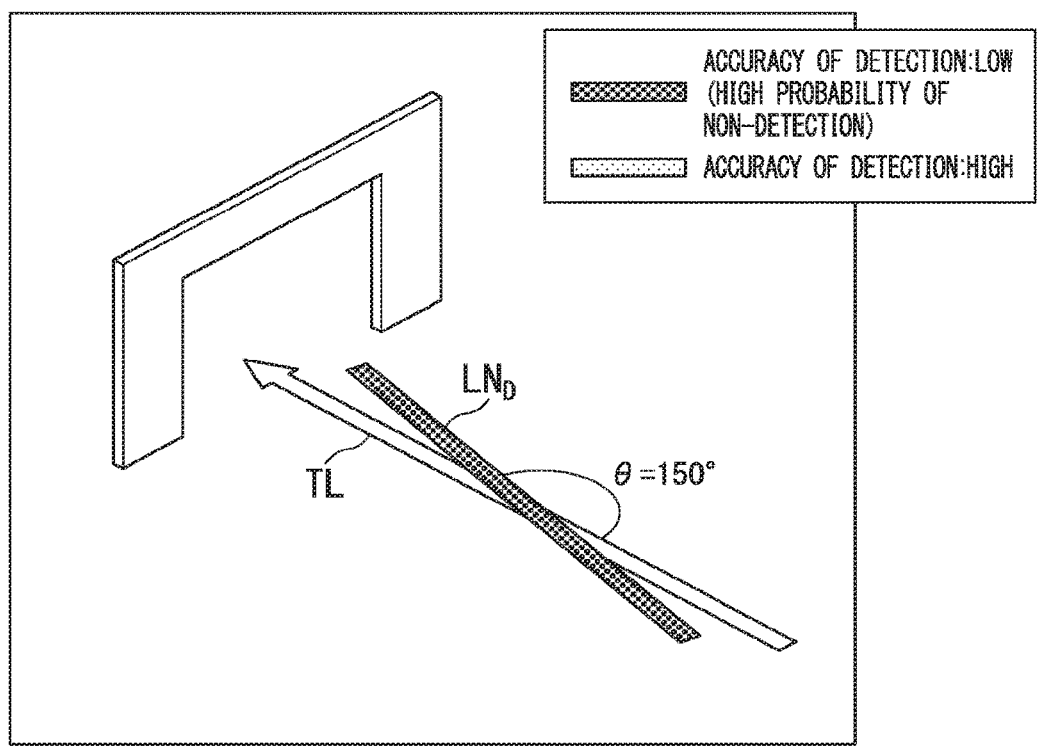
FIG. 20 is a diagram showing an example of a setting mode for the detection line.
Figure 21:
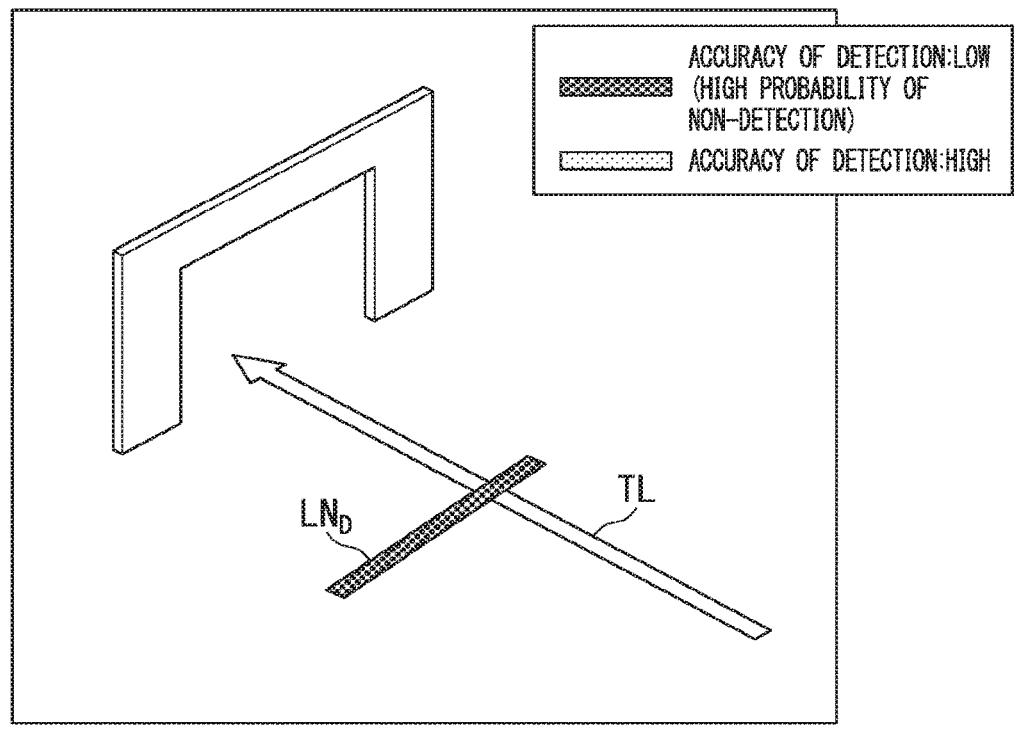
FIG. 21 is a diagram showing an example of a setting mode for the detection line.
Figure 22:
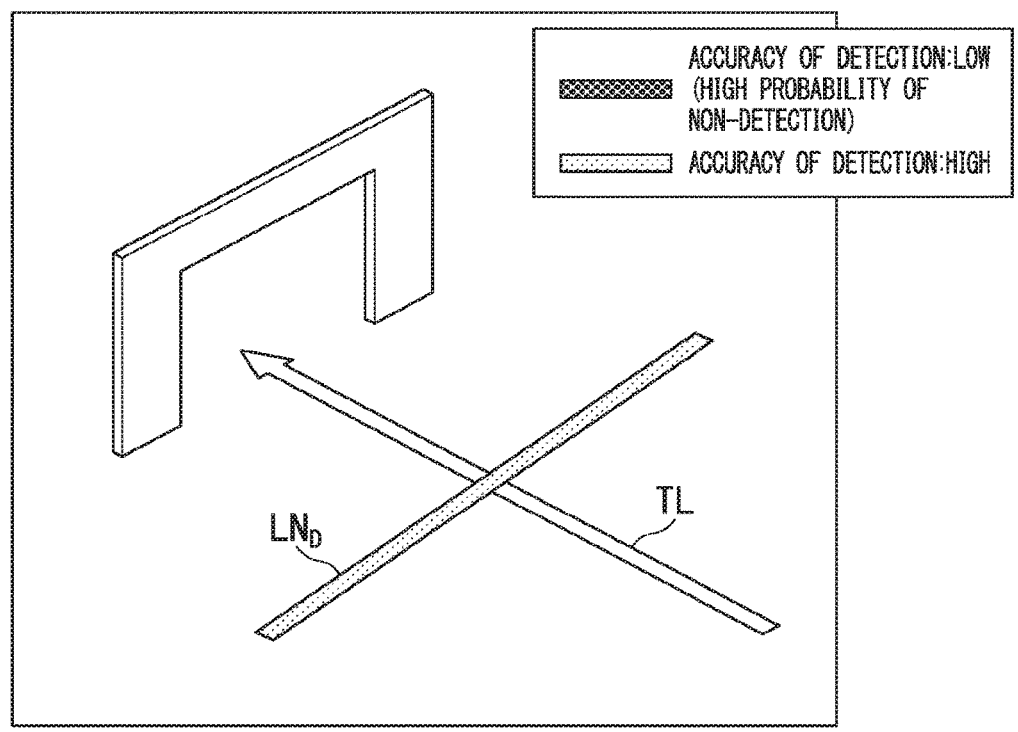
FIG. 22 is a diagram showing an example of a setting mode for the detection line.

FIGS. 19 to 22 are diagrams illustrating an example of a setting mode for the detection line $LN_D$. For example, as shown in FIG. 19, in a case where the detection line $LN_D$ is set at a position close to the end of the tracklet TL, there is an increasing probability of the tracklet TL of another target object and the detection line $LN_D$ not intersecting each other, and thus the evaluation and analyzer 120 evaluates a lower setting mode for this detection line $LN_D$ than a setting mode for the detection line $LN_D$ as illustrated in FIG. 22. In this case, the output controller 116 causes, for example, the display 104 to display a blue detection line $LN_D$ in order to indicate that the accuracy of detection of a target object based on the detection line $LN_D$ is low, that is, to indicate that the probability of non-detection increases.

In addition, for example, as shown in FIG. 20, in a case where the detection line $LN_D$ is set in a nearly parallel state such that an angle θ between the detection line and the tracklet TL is 150 degrees, there is a decreasing probability of a target object passing through the detection line $LN_D$, and thus the evaluation and analyzer 120 evaluates a lower setting mode for this detection line $LN_D$ than a setting mode for the detection line $LN_D$ as illustrated in FIG. 22. In this case, similarly to the example of FIG. 19, the output controller 116 causes the display 104 to display a blue detection line $LN_D$.

In addition, for example, as shown in FIG. 21, in a case where the vicinity of the end of the detection line $LN_D$ is set so as to intersect the tracklet TL, there is a decreasing probability of a target object passing through the detection line $LN_D$, and thus the evaluation and analyzer 120 evaluates a lower setting mode for this detection line $LN_D$ than a setting mode for the detection line $LN_D$ as illustrated in FIG.

22. In this case, similarly to the example of FIG. 19 or 20, the output controller 116 causes the display 104 to display a blue detection line $LN_D$.

In addition, for example, as shown in FIG. 22, in a case where the vicinity of the center of the detection line $LN_D$ is set so as to intersect the vicinity of the center of the tracklet TL in a state where the tracklet TL and the detection line $LN_D$ are nearly orthogonal to each other, there is an increasing probability of a target object passing through the detection line $LN_D$, and thus the evaluation and analyzer 120 evaluates a higher setting mode for this detection line $LN_D$ than the setting mode for the detection line $LN_D$ as illustrated in FIGS. 19 to 21. In this case, the output controller 116 causes, for example, the display 104 to display a yellow detection line $LN_D$ in order to indicate that the accuracy of detection of a target object based on the detection line $LN_D$ is high, that is, to indicate that the probability of non-detection has decreased.

Meanwhile, in the above-described example, the representation of the degree of the accuracy of detection of a target object by the color of the detection line $LN_D$ is not limited thereto. For example, the output controller 116 may represent the degree of the accuracy of detection of a target object, by the transparency, texture, line thickness or the like of the detection line $LN_D$, and may display characters or images indicating that the accuracy of detection of a target object is high or low, separately from the detection line $LN_D$. In addition, the output controller 116 may output the high or low accuracy of detection of a target object, as sounds, from a speaker (not shown) or the like. In addition, the output controller 116 may display the value of a weighted sum of the first score, the second score and the third score, as a probability value indicating the accuracy of detection of a target object.

According to the third embodiment described above, the tracklet TL and the detection line $LN_D$ intersect each other, but in a case where the tracklet TL is shortened without being able to sufficiently track a target object, or the like, a display method different from usual is used in a detection line $LN_D$ determined to have a low probability of the target object being able to be correctly detected, whereby it is possible for a user to confirm how accurately the set detection line $LN_D$ has been detected. Thereby, for example, since a user resets the detection line $LN_D$ again, it is possible to set the detection line $LN_D$ which makes it possible to detect a target object with a higher degree of accuracy.

Fourth Embodiment

Hereinafter, a fourth embodiment will be described. The fourth embodiment is different from the first to third embodiments in that when the tracklet TL and the detection line $LN_D$ intersect each other, the setting mode for the detection line $LN_D$ is evaluated in accordance with one or both of a distance from another tracklet TL and an angle between another tracklet TL and the detection line. Hereinafter, a description will be given with focus on differences from the first to third embodiments, and common parts with respect to those in the first to third embodiments will not be described.

For example, as is the case with the second embodiment, in a case where a tracklet TL selected as a detection target by a user and a tracklet TL which is a target for non-detection, not selected as a detection target by the user, are set among a plurality of tracklets TL, the detection line $LN_D$ may intersect the tracklet TL which is a target for detection, and may not intersect the tracklet TL which is a target for non-detection. That is, depending on the setting position of the detection line $LN_D$, as desired by a user, the tracklet TL which is a target for detection may be set to be in a "correctly detected state", and the tracklet TL which is a target for non-detection may be set to be in a "correctly non-detected state". However, in a case where the detection line $LN_D$ is set at a position close to the tracklet TL which is a target for non-detection, or the extended line of the detection line $LN_D$ is set so as to intersect the tracklet TL which is a target for non-detection, there is an increasing probability of even the tracklet TL which is a target for non-detection being erroneously detected by the detection line $LN_D$.

Therefore, even in a case where the detection line $LN_D$ does not intersect the tracklet TL which is a target for non-detection, and a high evaluation of the setting mode is made, an evaluation and analyzer 120 of the fourth embodiment lowers the evaluation of the setting mode for the detection line $LN_D$ in a case where a distance between the tracklet TL and the detection line $LN_D$ are short, or a case where the extended line of the detection line $LN_D$ intersects the tracklet TL which is a target for non-detection at a nearly orthogonal angle.

For example, when the tracklet TL which is a target for detection and the detection line $LN_D$ intersect each other, the evaluation and analyzer 120 may increase the score as a distance between (shortest distance) the tracklet TL which is a target for non-detection and the detection line $LN_D$ becomes longer, and may lower the score as the distance between the tracklet TL which is a target for non-detection and the detection line $LN_D$ becomes shorter.

In addition, for example, when the tracklet TL which is a target for detection and the detection line $LN_D$ intersect each other, the evaluation and analyzer 120 may increase the score as an angle φ between the tracklet TL which is a target for non-detection and the detection line $LN_D$ approaches 0 degrees or 180 degrees, and may lower the score as the angle φ approaches 90 degrees.

The evaluation and analyzer 120 evaluates a setting mode for a final detection line $LN_D$ on the basis of one or both of a score (hereinafter, called a fourth score) obtained by evaluating a distance between the tracklet TL which is a target for non-detection and the detection line $LN_D$ and a score (hereinafter, called a fifth score) obtained by evaluating an angle φ between the tracklet TL which is a target for non-detection and the detection line $LN_D$. For example, the evaluation and analyzer 120 evaluates a higher setting mode as a weighted sum of these scores becomes larger.

Figure 23:
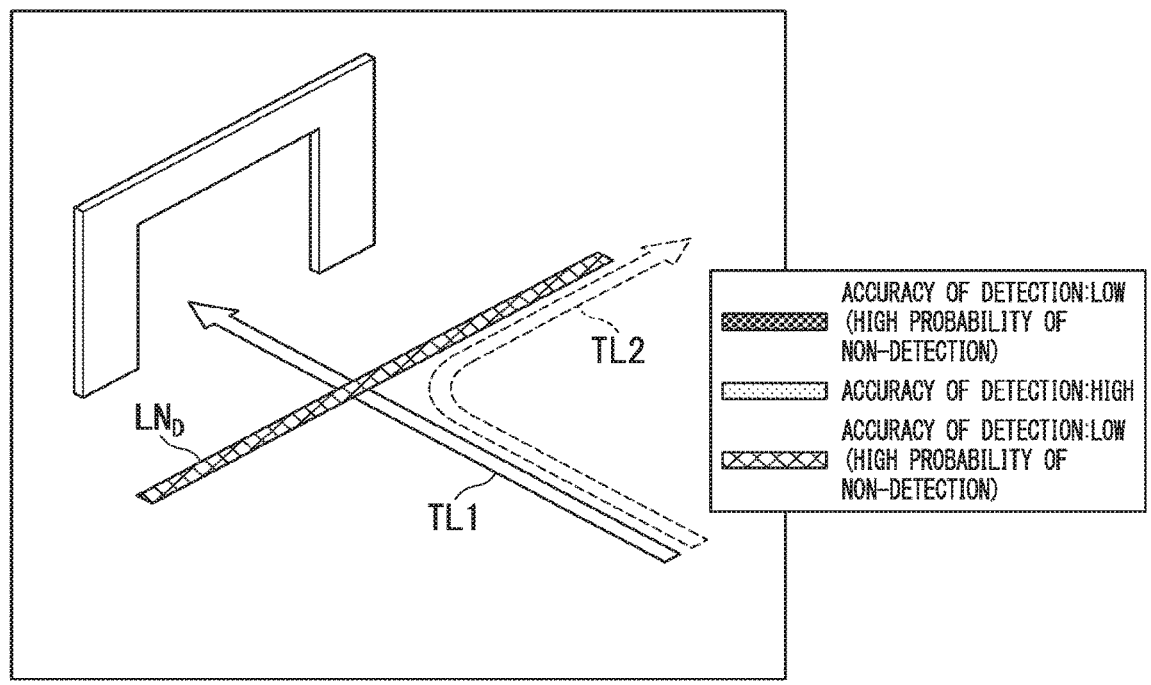
FIG. 23 is a diagram showing another example of a setting mode for the detection line.
Figure 24:
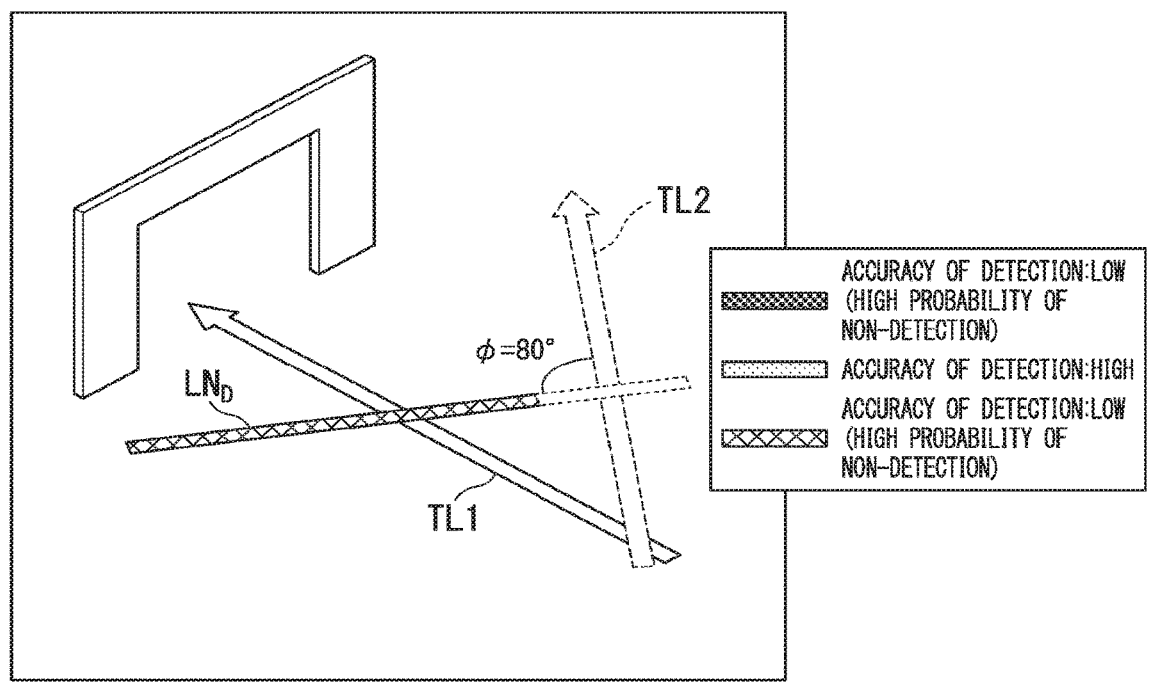
FIG. 24 is a diagram showing another example of a setting mode for the detection line.

FIGS. 23 and 24 are diagrams illustrating another example of the setting mode for the detection line $LN_D$. In the drawing, TL1 is a tracklet which is a target for detection, and TL2 is a tracklet which is a target for non-detection. In the example of FIG. 23, since the detection line $LN_D$ and the tracklet TL1 which is a target for detection intersect each other in a nearly orthogonal state, the evaluation and analyzer 120 originally evaluates a high setting mode for this detection line $LN_D$. However, since a distance between the detection line $LN_D$ and the tracklet TL2 which is a target for non-detection is short, the evaluation and analyzer 120 evaluates a lower setting mode than the setting mode for the detection line $LN_D$ as illustrated in FIG. 22 described above. In this case, the output controller 116 causes, for example, the display 104 to display a red detection line $LN_D$ in order to indicate that the accuracy of detection of a target object based on the detection line $LN_D$ is low, that is, to indicate that the probability of over-detection increases.

In addition, in the example of FIG. 24, the detection line $LN_D$ does not intersect the tracklet TL2 which is a target for non-detection, while the extended line of the detection line $LN_D$ intersects the tracklet. In such a case, the evaluation and analyzer 120 evaluates a lower setting mode than the setting mode for the detection line $LN_D$ as illustrated in FIG. 22 described above. The output controller 116 causes, for example, the display 104 to display a red detection line $LN_D$ in order to indicate that the accuracy of detection of a target object based on the detection line $LN_D$ is low, that is, to indicate that the probability of over-detection increases.

Meanwhile, the evaluation and analyzer 120 may evaluate the setting mode for the detection line $LN_D$ in further consideration of some or all of the intersection position on the tracklet TL, the intersection position on the detection line $LN_D$, and the angle between the tracklet TL and the detection line $LN_D$ which are described in the aforementioned third embodiment, in addition to one or both of a distance from the tracklet TL which is a target for non-detection and an angle between the tracklet TL which is a target for non-detection and the detection line. In a case where these five elements are considered, the evaluation and analyzer 120 may evaluate a higher setting mode for the detection line $LN_D$ as a weighted sum of all the first to fifth scores becomes larger.

According to the fourth embodiment described above, in a case where the tracklet TL which is a target for detection and the tracklet TL which is a target for non-detection are designated by a user, the tracklet TL which is a target for detection and the detection line $LN_D$ intersect each other, and the tracklet TL which is a target for non-detection and the detection line $LN_D$ do not intersect each other, but a display method different from usual is used in a detection line $LN_D$ (detection line $LN_D$ having the fourth score and the fifth score which are low) having a high probability of erroneously detecting passing through of a target object depicting the same movement trajectory as that of the tracklet TL which is a target for non-detection, whereby it is possible for a user to confirm how accurately the set detection line $LN_D$ has been detected. Thereby, for example, since a user resets the detection line $LN_D$ again, it is possible to set the detection line $LN_D$ which makes it possible to detect a target object with a higher degree of accuracy.

Fifth Embodiment

Hereinafter, a fifth embodiment will be described. The fifth embodiment is different from the first to fourth embodiments in that candidates for the detection line $LN_D$ are presented in advance, and a user is caused to select a candidate used as the detection line $LN_D$ from among these candidates. Hereinafter, a description will be given with focus on differences from the first to fourth embodiments, and common parts with respect to those in the first to fourth embodiments will not be described.

A detection region-setter 118 of the fifth embodiment sets, for example, a straight line or a curved line, having the most number of intersections with tracklets TL included in a certain first group, and the least number of intersections with tracklets TL included in a second group which is a set of tracklets TL excluding the first group, as a candidate for the detection line $LN_D$. The first group is a set of one or more tracklets TL of which start points or end points are located in the vicinity of an entrance port.

Figure 25:
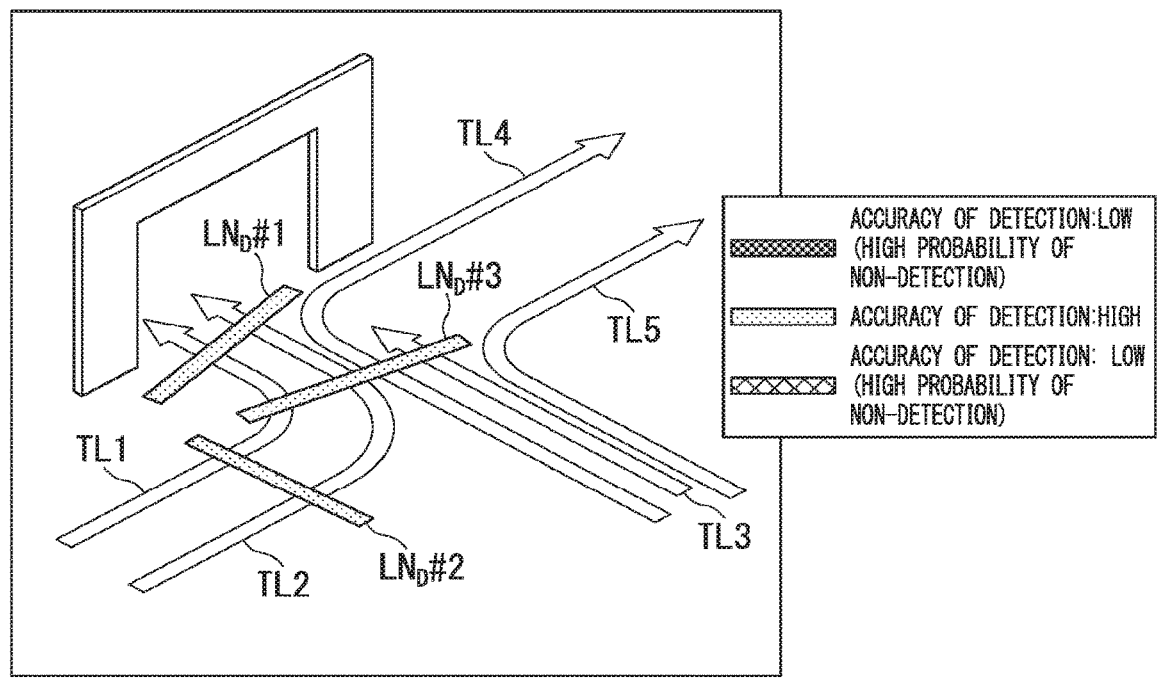
FIG. 25 is a diagram showing a method of setting candidates for the detection line.

FIG. 25 is a diagram showing a method of setting candidates for the detection line $LN_D$. Tracklets TL1 to TL3 in the drawing are included in the first group, and tracklets TL4 and TL5 are included in the second group. In this case, the detection region-setter 118 sets, for example, a candidate $LN_D$#1 or $LN_D$#2 which is a detection line. Meanwhile, the detection region-setter 118 may set a candidate for a detection line, such as $LN_D$#3, which intersects a tracklet TL which is a part of the second group.

In addition, the detection region-setter 118 may set, for example, a straight line or a curved line, having the maximum number of intersections with tracklets TL facing toward the direction of the entrance port or toward the opposite direction of the entrance port, and the minimum number of intersections with other tracklets TL, as a candidate for the detection line $LN_D$.

In addition, the detection region-setter 118 may set, for example, a straight line or a curved line, having the maximum number of intersections with tracklets TL selected as detection targets by a user, and the minimum number of intersections with other tracklets TL, as a candidate for the detection line $LN_D$.

The detection region-setter 118 determines a candidate selected from among candidates for one or more detection lines $LN_D$ presented to a user, as the detection line $LN_D$. Meanwhile, in a case where the start point, the end point or the like of a straight line or a curved line determined as the detection line $LN_D$ from among candidates for detection lines $LN_D$ is re-designated by a user, the detection region-setter 118 may change the length, the degree of curvature or the like of the detection line $LN_D$ so as to pass through this re-designated point.

In addition, the detection region-setter 118 of the fifth embodiment may newly set candidates for one or more detection lines $LN_D$ on the basis of the evaluation of a setting mode for the detection line $LN_D$ set in the past in accordance with a user's operation. For example, a plurality of detection lines $LN_D$ having different evaluations of setting modes are set with respect to the patterns of tracklets TL such as a relative positional relationship between a plurality of tracklets TL, and the length or the degree of curvature of each of a plurality of tracklets TL. In this case, in a case where the pattern of a tracklet TL in this time is similar to the pattern of a tracklet TL in the past when candidates for detection lines $LN_D$ are set, the detection region-setter 118 preferentially sets a detection line $LN_D$ having a higher evaluation of a setting mode among a plurality of detection lines $LN_D$ set at the tracklet TL of this pattern, as a candidate for a detection line $LN_D$ in this time.

In addition, the detection region-setter 118 of the fifth embodiment may learn a user's preferences for a setting mode for the detection line $LN_D$, and set the detection line $LN_D$ automatically (irrespective of a user's operation) in accordance with the learned preference. For example, when a user sets a tracklet TL which is a target for detection and a tracklet TL which is a target for non-detection, in a case where a detection line $LN_D$ is often set at a position where the tracklet TL which is a target for non-detection is detected together with the tracklet TL which is a target for detection, that is, a case where a detection line $LN_D$ having a certain amount of "over-detection" allowed is often set in order to prioritize "correct detection", the detection region-setter 118 learns that this user prefers to improve the accuracy of detection of a tracklet TL by, forcibly if necessary, allowing the over-detection. In addition, for example, when a user sets a tracklet TL which is a target for detection and a tracklet TL which is a target for non-detection, in a case where a detection line $LN_D$ is often set at a preferential position where the tracklet TL which is a target for non-detection is not detected though the tracklet TL which is a target for detection is not detected, that is, a case where a detection line $LN_D$ having a certain amount of "non-detection"

allowed is often set in order to prioritize not to be "over-detected", the detection region-setter 118 learns that this user prefers to prohibit the over-detection by, forcibly if necessary, lowering the accuracy of detection of a tracklet TL.

The detection region-setter 118 automatically sets a new detection line $LN_D$ in accordance with this learned user's preferences for a setting mode for the detection line $LN_D$. For example, in a case where a user having learned a tendency to set a detection line $LN_D$ having a certain amount of "over-detection" allowed in order to prioritize "correct detection" attempts to newly set a detection line $LN_D$, the detection region-setter 118 may automatically set a detection line $LN_D$ which is given the highest-priority of "correct detection" while allowing the "over-detection", on the basis of this learning result. Thereby, it is possible to save much time and effort for a user to set a detection line $LN_D$, and to improve the user's convenience.

Figure 26:
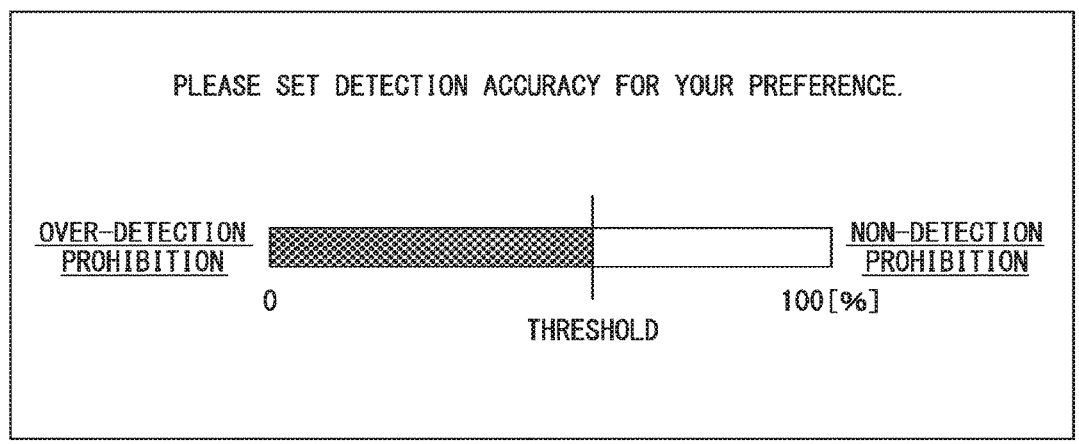
FIG. 26 is a diagram showing an example of a screen on which preferences for a setting mode for the detection line are set.

Meanwhile, a user's preferences for a setting mode for the detection line $LN_D$ which are learned by the detection region-setter 118 may be determined by the user himself (or herself). FIG. 26 is a diagram showing an example of a screen for setting the preferences for a setting mode for the detection line $LN_D$. For example, the output controller 116 causes the display 104 to display a screen as illustrated in FIG. 26, and causes a user to set the preferences for a setting mode for the detection line $LN_D$. A bar indicating a threshold in the drawing is used for adjusting, for example, the degree of the accuracy of detection of the tracklet TL based on the detection line $LN_D$. A user moves this bar to the 0[%] side or the 100[%] side, to thereby make a setting to a desired accuracy of detection. The 0[%] side indicates, for example, that the tracklet TL is prohibited from being set to "over-detection" by the detection line $LN_D$, and the 100[%] side indicates, for example, that the tracklet TL is prohibited from being set to "non-detection" by the detection line $LN_D$.

In addition, in a case where the detection line $LN_D$ is set for each area under surveillance of each camera 10, the detection region-setter 118 may set a setting mode for the detection line $LN_D$ set with respect to a certain area under surveillance, to a setting mode for the detection line $LN_D$ set with respect to another area under surveillance.

Figures 27, 28:
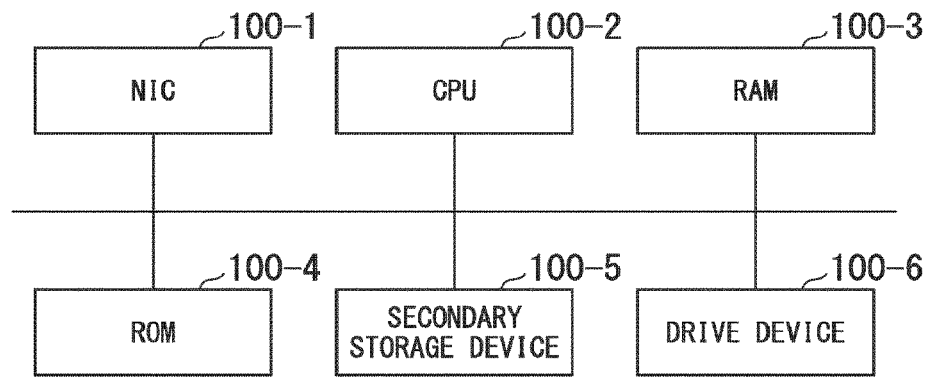
FIG. 27 is a diagram showing a method of reflecting a setting mode for a detection line in a certain area under surveillance in a setting mode for a detection line in another area under surveillance.
FIG. 28 is a diagram showing an example of a hardware configuration of the image-processing apparatus of an embodiment.

FIG. 27 is a diagram showing a method of reflecting a setting mode for the detection line $LN_D$ of a certain area under surveillance in a setting mode for the detection line $LN_D$ of another area under surveillance. For example, in a case where one hundred cameras 10 are installed in a certain facility X, a user who manages the facility X may set the detection line $LN_D$ at an update timing determined in advance, with respect to the area under surveillance of each of the one hundred cameras 10. In this case, the detection region-setter 118 may set a detection line $LN_D$ in another area under surveillance such as an area under surveillance B or C, in a setting mode for the detection line $LN_D$ set with respect to a certain area under surveillance A. Thereby, it is possible to save more time and effort than when a user sets detection lines $LN_D$ with respect to all the areas under surveillance, and to improve the user's convenience.

According to the fifth embodiment described above, since a user is presented candidates for detection lines $LN_D$ which are set in advance so as to pass through a certain amount of tracklets TL, the user may just select a detection line $LN_D$ from among the presented candidates, and it is possible to save much time and effort for the user to set the detection line $LN_D$. As a result, it is possible to improve a user's convenience.

In addition, according to the fifth embodiment described above, since candidates for one or more detection lines $LN_D$ are newly set on the basis of the evaluation of a setting mode for the detection line $LN_D$ set in the past in accordance with a user's operation, a detection line $LN_D$ close to a mode when the user performs a setting by himself (or herself) can be selected from among candidates for a plurality of detection lines $LN_D$. As a result, it is possible to further save much time and effort for the user to set the detection line $LN_D$, and to improve the user's convenience.

In addition, according to the fifth embodiment described above, since a user' preferences for a setting mode for the detection line $LN_D$ are learned, it is possible to automatically set the detection line $LN_D$ in accordance with the user's preference.

In addition, according to the fifth embodiment described above, since the detection line $LN_D$ is uniformly set in each area under surveillance for each camera 10 on the basis of the learned user's preferences for a setting mode for the detection line $LN_D$, it is possible to save more time and effort than when a user sets detection lines $LN_D$ with respect to all the areas under surveillance, and to improve the user's convenience.

Sixth Embodiment

Hereinafter, a sixth embodiment will be described. The sixth embodiment is different from the first to fifth embodiments in that when an object is tracked in a moving image, the degree of conviction indicating the degree of probability of the tracked object being a target object is obtained, and tracking information including only a tracklet TL which is the movement trajectory of an object of which the degree of conviction is equal to or greater than a threshold is stored in the storage 130 or the external storage device. Hereinafter, a description will be given with focus on differences from the first to fifth embodiments, and common parts with respect to those in the first to fifth embodiments will not be described.

An object-tracker 112 of the sixth embodiment derives the degree of conviction for each object which is a target for tracking. For example, the object-tracker 112 may derive a similarity between an image region overlapping a detection window $W_D$ and a template image as the degree of conviction, may derive a similarity between objects detected in each of a plurality of frames as the degree of conviction, may derive a similarity between the image region overlapping the detection window $W_D$ and a background image as the degree of conviction, and may derive a difference in a hue, a luminance value, a luminance gradient or the like between a plurality of frames as the degree of conviction. In addition, the object-tracker 112 may derive a value such as a weighted sum when these parameters are combined as the degree of conviction.

A storage controller 114 of the sixth embodiment sets an object of which the degree of conviction is equal to or greater than a threshold, among objects of which the degrees of conviction are derived by the object-tracker 112, to a target object (for example, person), and causes the storage 130 or an external storage device to store tracking information including only a tracklet TL which is the movement trajectory of the object of which the degree of conviction is equal to or greater than a threshold. Thereby, a detection region-setter 118 of the sixth embodiment sets the detection window $W_D$ using only a tracklet TL of an object having a high degree of conviction indicating a target object.

According to the sixth embodiment described above, only a tracklet TL of an object having a high degree of conviction indicating a person is included in the tracking information, it is possible to suppress the setting of the detection window $W_D$ with reference to tracklets TL of objects other than a target object which is erroneously tracked.

Meanwhile, in any of the above-described embodiments, a description has been given in which the output controller 116 changes a display mode for the tracking information on the basis of the evaluation result of the evaluation and analyzer 120, but there is no limitation thereto. For example, the output controller 116 may cause a user to perform setting feedback on the detection line $LN_D$ by causing a speaker (not shown) to output the evaluation result of the evaluation and analyzer 120 as a sound. For example, the output controller 116 may perform sound guidance on the contents such as "A detection line $LN_D$ set by a user intersects a tracklet TL having an accuracy of detection of ○○%", or the contents such as "An over-detected state was detected by a detection line $LN_D$ set by a user".

(Hardware Configuration)

The image-processing apparatus 100 of an embodiment described above is realized by, for example, a hardware configuration as shown in FIG. 28. FIG. 28 is a diagram showing an example of a hardware configuration of the image-processing apparatus 100 of an embodiment.

The image-processing apparatus 100 is configured such that an NIC 100-1, a CPU 100-2, a RAM 100-3, a ROM 100-4, a secondary storage device 100-5 such as a flash memory or a HDD, and a drive device 100-6 are connected to each other by an internal bus or an exclusive communication line. A portable storage medium such as an optical disc is mounted in the drive device 100-6. A program stored in the secondary storage device 100-5 or a portable storage medium mounted in the drive device 100-6 is developed in the RAM 100-3 by a DMA controller (not shown) or the like, and is executed by the CPU 100-2, whereby the controller 110 is realized. A program referred to by the controller 110 may be downloaded from other devices through a communication network NW.

According to at least one embodiment described above, a target object is tracked in a moving image, tracking information including a tracklet TL which is a movement trajectory of the tracked object is stored in the storage 130 or the external storage device, a detection line $LN_D$ or a detection region $R_D$ for detecting passing through of an object is set in a frame within the moving image on the basis of the tracklet TL included in the tracking information, a setting mode for the detection line $LN_D$ or the detection region $R_D$ is evaluated on the basis of this set detection line $LN_D$ or detection region $R_D$ and the tracklet TL, and the tracking information is output in an output mode based on the evaluation result, whereby it is possible to improve the accuracy of detection of an entering or leaving person.

The above embodiment can be represented as follows.
An image-processing apparatus, including:
an output device configured to output information;
a storage configured to store a program; and
a processor,
wherein by executing the program, the processor
tracks an object which is a target in one or more time-series images,
stores tracking information including movement trajectories of one or more of the tracked objects in the storage or an external storage,
sets a detection region for detecting passing through of the object on the basis of the movement trajectory of the object, on the image, in accordance with a user's operation,
evaluates a setting mode for the detection region on the basis of the tracking information stored in the storage or the external storage and the set detection region, and
outputs the tracking information stored in the storage or the external storage, from the output unit in an output mode based on an evaluation result of the setting mode for the detection region.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image-processing apparatus, comprising:
an output unit configured to output information;
a tracker configured to track an object which is a target in one or more time-series images;
a storage controller configured to store tracking information including movement trajectories of one or more of the objects tracked by the tracker, in a predetermined storage;
a setter configured to set a detection region for detecting passing through of the object on the basis of the movement trajectory of the object, on the image, in accordance with a user's operation;
an evaluator configured to evaluate a setting mode for the detection region on the basis of the tracking information stored in the predetermined storage and the detection region which is set by the setter; and
an output controller configured to output the tracking information stored in the predetermined storage, from the output unit in an output mode based on an evaluation result of the evaluator,
wherein the evaluator evaluates a setting mode for the detection region, for each movement trajectory selected by the user, according to a presence or absence of intersection between one or more movement trajectories and the detection region which is set by the setter, the one or more movement trajectories being selected by the user from among movement trajectories of one or more of the objects included in the tracking information stored in the predetermined storage.

2. The image-processing apparatus according to claim 1, wherein the evaluator evaluates a high setting mode for the detection region with respect to a movement trajectory that intersects the detection region among the one or more movement trajectories selected by the user, and evaluates a low setting mode for the detection region with respect to a movement trajectory that does not intersect the detection region.

3. The image-processing apparatus according to claim 2, wherein the output unit includes a display configured to display an image, and
the output controller performs a display for further highlighting the movement trajectory for which a higher evaluation of the setting mode for the detection region is made by the evaluator, on the display.

4. The image-processing apparatus according to claim 1, wherein the evaluator evaluates a low setting mode for the detection region with respect to a movement trajectory that intersects the detection region among the one or more movement trajectories which are not selected by the user, and evaluates a high setting mode for the detection region with respect to a movement trajectory that does not intersect the detection region.

5. The image-processing apparatus according to claim 4, wherein the output unit includes a display configured to display an image, and
the output controller performs a display for further highlighting the movement trajectory for which a lower evaluation of the setting mode for the detection region is made by the evaluator, on the display.

6. The image-processing apparatus according to claim 1, wherein the output controller further outputs the detection region, set on the image by the setter, from the output unit, in an output mode based on the evaluation result.

7. The image-processing apparatus according to claim 6, wherein in a case where one or more movement trajectories selected by the user from among movement trajectories of one or more of the objects included in the tracking information stored in the predetermined storage and the detection region intersect each other, the evaluator evaluates the setting mode for the detection region in accordance with an intersection position on the one or more movement trajectories.

8. The image-processing apparatus according to claim 7, wherein the evaluator evaluates a higher setting mode for the detection region as the intersection position approaches a center of the movement trajectory, and evaluates a lower setting mode for the detection region as the intersection position becomes farther away from the center of the movement trajectory.

9. The image-processing apparatus according to claim 6, wherein in a case where one or more movement trajectories selected by the user from among movement trajectories of one or more of the objects included in the tracking information stored in the predetermined storage and the detection region intersect each other, the evaluator evaluates the setting mode for the detection region in accordance with an intersection position in the one or more detection regions.

10. The image-processing apparatus according to claim 9, wherein the evaluator evaluates a higher setting mode for the detection region as the intersection position approaches a center of the detection region, and evaluates a lower setting mode for the detection region as the intersection position becomes farther away from the center of the detection region.

11. The image-processing apparatus according to claim 6, wherein the evaluator evaluates the setting mode for the detection region in accordance with an angle between one or more movement trajectories selected by the user from among movement trajectories of one or more of the objects included in the tracking information stored in the predetermined storage and the detection region.

12. The image-processing apparatus according to claim 11, wherein the evaluator evaluates a higher setting mode for the detection region as the angle approaches 90 degrees, and evaluates a lower setting mode for the detection region as the angle approaches 0 degrees or 180 degrees.

13. The image-processing apparatus according to claim 6, wherein the evaluator evaluates the setting mode for the detection region in accordance with a distance between one or more movement trajectories which are not selected by the user from among movement trajectories of one or more of the objects included in the tracking information stored in the predetermined storage and the detection region.

14. The image-processing apparatus according to claim 13, wherein the evaluator evaluates a lower setting mode for the detection region as the distance becomes shorter.

15. The image-processing apparatus according to claim 6, wherein the evaluator evaluates the setting mode for the detection region in accordance with an angle between one or more movement trajectories which are not selected by the user from among movement trajectories of one or more of the objects included in the tracking information stored in the predetermined storage and the detection region.

16. The image-processing apparatus according to claim 15, wherein the evaluator evaluates a lower setting mode for the detection region as the angle approaches 90 degrees.

17. The image-processing apparatus according to claim 2, wherein the detection region is a detection line.

18. The image-processing apparatus according to claim 1, wherein the setter further sets candidates for one or more of the detection regions on the image, and
determines a candidate, selected by the user from among the candidates for one or more of the detection regions set on the image, as the detection region.

19. The image-processing apparatus according to claim 1, wherein the tracker derives a degree of conviction indicating a degree of probability of an object to be tracked in the one or more time-series images being an object which is the target, and
the storage controller stores the tracking information, including a movement trajectory of an object of which the degree of conviction derived by the tracker is equal to or greater than a threshold among one or more of the objects tracked by the tracker, in the predetermined storage.

20. The image-processing apparatus according to claim 1, wherein the movement trajectory of the object includes a moving direction of the object, and
the output controller outputs the tracking information, stored in the predetermined storage, from the output unit, in an output mode according to the moving direction of the object.

21. An image-processing system, comprising:
the image-processing apparatus according to claim 1; and
one or more cameras configured to generate the one or more time-series images.

22. An image-processing method comprising causing a computer to:
track an object which is a target in one or more time-series images;
store tracking information including movement trajectories of one or more of the tracked objects in a predetermined storage;
set a detection region for detecting passing through of the object on the basis of the movement trajectory of the object, on the image, in accordance with a user's operation;
evaluate a setting mode for the detection region on the basis of the tracking information stored in the predetermined storage and the set detection region; and
output the tracking information, stored in the predetermined storage, from an output unit configured to output information, in an output mode based on an evaluation result of the setting mode for the detection region, evaluate a setting mode for the detection region, for each movement trajectory selected by the user, according to a presence or absence of intersection between one or more movement trajectories and the detection region, the one or more movement trajectories being selected by the user from among movement trajectories of one or more of the objects included in the tracking information stored in the predetermined storage.

23. A non-transitory computer-readable storage medium having a program stored therein, the program causing a computer to execute:

a process of tracking an object which is a target in one or more time-series images;

a process of storing tracking information including movement trajectories of one or more of the tracked objects in a predetermined storage;

a process of setting a detection region for detecting passing through of the object on the basis of the movement trajectory of the object, on the image, in accordance with a user's operation;

a process of evaluating the setting mode for the detection region on the basis of the tracking information stored in the predetermined storage and the set detection region; and a process of outputting the tracking information, stored in the predetermined storage, from an output unit configured to output information, in an output mode based on an evaluation result of the setting mode for the detection region, a process of evaluating a setting mode for the detection region, for each movement trajectory selected by the user, according to as presence or absence of intersection between one or more movement trajectories and the detection region, the one or more movement trajectories being selected by the user from among movement trajectories of one or more of the objects included in the tracking information stored in the predetermined storage.

* * * * *